(12) United States Patent
Iwatsuki et al.

(10) Patent No.: US 7,427,254 B2
(45) Date of Patent: Sep. 23, 2008

(54) DECELERATION CONTROL APPARATUS AND METHOD FOR A VEHICLE

(75) Inventors: Kunihiro Iwatsuki, Toyota (JP); Kazuyuki Shiiba, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 174 days.

(21) Appl. No.: 10/998,958

(22) Filed: Nov. 30, 2004

(65) Prior Publication Data

US 2005/0124458 A1    Jun. 9, 2005

(30) Foreign Application Priority Data

Dec. 5, 2003    (JP)    ............... 2003-407779

(51) Int. Cl.
*B60W 10/10* (2006.01)
*B60W 10/18* (2006.01)

(52) U.S. Cl. ........................ 477/92; 477/97
(58) Field of Classification Search ........... 477/92, 477/94, 901, 903; 475/121
See application file for complete search history.

(56) References Cited

U.S. PATENT DOCUMENTS

| | | |
|---|---|---|
| 4,771,657 A | 9/1988 | Iwatsuki |
| 5,113,718 A | 5/1992 | Sato |
| 5,731,977 A | 3/1998 | Taniguchi et al. |
| 5,748,476 A | 5/1998 | Sekine et al. |
| 5,902,345 A | 5/1999 | Minowa et al. |
| 6,126,251 A | 10/2000 | Yoshii et al. |
| 6,161,073 A | 12/2000 | Tange et al. |
| 6,182,000 B1 | 1/2001 | Ohta et al. |
| 6,188,316 B1 | 2/2001 | Matsuno et al. |
| 6,199,001 B1 | 3/2001 | Ohta et al. |
| 6,208,927 B1 | 3/2001 | Mine et al. |
| 6,216,082 B1 | 4/2001 | Minowa et al. |

(Continued)

FOREIGN PATENT DOCUMENTS

DE    196 21 085 A1    11/1996

(Continued)

OTHER PUBLICATIONS

U.S. Appl. No. 11/491,039, filed Jul. 24, 2006, Shiiba et al.

(Continued)

*Primary Examiner*—Sherry Estremsky
*Assistant Examiner*—Edwin A Young
(74) *Attorney, Agent, or Firm*—Oblon, Spivak, McClelland, Maier & Neustadt, P.C.

(57) ABSTRACT

A declaration control apparatus and method for a vehicle, which performs deceleration control such that a deceleration acting on the vehicle becomes equal to a target deceleration by an operation of a brake system which applies a braking force to the vehicle and a shift operation which shifts a transmission of the vehicle into a relatively low speed or speed ratio, increases the target deceleration over time at a predetermined gradient to a predetermined value when a determination that there is a need to shift the transmission into a relatively low speed or speed ratio has been made, and after the target deceleration reaches the predetermined value, maintains the target deceleration at a generally constant value. As a result, a deceleration transitional characteristic of the vehicle is able to be improved.

20 Claims, 14 Drawing Sheets

U.S. PATENT DOCUMENTS

| | | |
|---|---|---|
| 6,223,118 B1 | 4/2001 | Kobayashi et al. |
| 6,287,237 B1 | 9/2001 | Graf et al. |
| 6,353,787 B2 | 3/2002 | Nishiyama |
| 6,868,324 B2 | 3/2005 | Matsumoto et al. |
| 2002/0026276 A1 | 2/2002 | Hattori et al. |
| 2005/0124458 A1 | 6/2005 | Iwatsuki et al. |

FOREIGN PATENT DOCUMENTS

| | | |
|---|---|---|
| DE | 198 07 095 A1 | 8/1999 |
| DE | 199 13 620 A1 | 10/1999 |
| DE | 199 22 242 A1 | 12/1999 |
| DE | 100 39 920 A1 | 3/2001 |
| DE | 101 41 919 A1 | 3/2002 |
| DE | 102 16 546 A1 | 10/2002 |
| EP | 1 044 843 A2 | 10/2000 |
| EP | 1 197 684 A1 | 4/2002 |
| JP | 64-30848 | 2/1989 |
| JP | 2-296062 | 12/1990 |
| JP | 5-240075 | 9/1993 |
| JP | 6-199156 | 7/1994 |
| JP | 7-1995 | 1/1995 |
| JP | 7-306998 | 11/1995 |
| JP | 8-85362 | 4/1996 |
| JP | 8-85373 | 4/1996 |
| JP | 2503426 | 4/1996 |
| JP | 8-147598 | 6/1996 |
| JP | 8-150914 | 6/1996 |
| JP | 08-301084 | 11/1996 |
| JP | 9-242863 | 9/1997 |
| JP | 10-184877 | 7/1998 |
| JP | 10-185603 | 7/1998 |
| JP | 10-203203 | 8/1998 |
| JP | 10-236290 | 9/1998 |
| JP | 10-264788 | 10/1998 |
| JP | 10-264791 | 10/1998 |
| JP | 10-324175 | 12/1998 |
| JP | 11-63211 | 3/1999 |
| JP | 11-115545 | 4/1999 |
| JP | 11-278096 | 10/1999 |
| JP | 2000-39062 | 2/2000 |
| JP | 2000-43696 | 2/2000 |
| JP | 2000-127803 | 5/2000 |
| JP | 2000-168521 | 6/2000 |
| JP | 2000-233730 | 8/2000 |
| JP | 2002-217028 | 8/2000 |
| JP | 2000-245016 | 9/2000 |
| JP | 2000-318484 | 11/2000 |
| JP | 2001-26228 | 1/2001 |
| JP | 2001-27317 | 1/2001 |
| JP | 2001-30792 | 2/2001 |
| JP | 2001-90831 | 4/2001 |
| JP | 2001-341546 | 12/2001 |
| JP | 2003-54395 | 2/2003 |
| JP | 2003-99897 | 4/2003 |
| JP | 2003-118425 | 4/2003 |
| JP | 2003-237420 | 8/2003 |
| JP | 2003-256999 | 9/2003 |
| JP | 2004-136725 | 5/2004 |
| KR | 1997-0044795 | 7/1997 |
| KR | 1998-046906 | 9/1998 |

OTHER PUBLICATIONS

U.S. Appl. No. 11/338,693, filed Jan. 25, 2006, Shiiba et al.

FIG. 4

|     | C0 | C1 | C2 | B0 | B1 | B2 | B3 | B4 | F0 | F1 | F2 |
|-----|----|----|----|----|----|----|----|----|----|----|----|
| P   | ○  |    |    |    |    |    |    |    | ○  |    |    |
| R   |    |    | ○  | ○  |    |    |    | ○  |    |    |    |
| N   | ○  |    |    |    |    |    |    |    | ○  |    |    |
| 1st | ○  | ○  |    |    |    |    |    | ◎  | ○  |    | ○  |
| 2nd | ◎  | ○  |    |    |    |    | ○  |    | ○  |    |    |
| 3rd | ○  | ○  |    |    | ◎  | ○  |    |    | ○  | ○  |    |
| 4th | ○  | ○  | ○  |    |    | △  |    |    | ○  |    |    |
| 5th |    | ○  | ○  | ○  |    | △  |    |    |    |    |    |

○ APPLIED

◎ APPLIED WHEN ENGINE BRAKE IS ENGAGED

△ APPLIED BUT NOT TRANSMITTING POWER

TRANSITIONAL CHARACTERISTICS (EFFECTS)

TRANSITIONAL CHARACTERISTICS (EFFECTS)

TRANSITIONAL CHARACTERISTICS (EFFECTS)

DECELERATION CONTROL APPARATUS AND METHOD FOR A VEHICLE

INCORPORATION BY REFERENCE

The disclosure of Japanese Patent Application No. 2003-407779 filed on Dec. 5, 2003, including the specification, drawings and abstract is incorporated herein by reference in its entirety.

BACKGROUND OF THE INVENTION

1. Field of the Invention

The invention relates to a deceleration control apparatus and method for a vehicle. More particularly, the invention relates to a deceleration control apparatus and method for a vehicle, which controls deceleration of the vehicle by an operation of a brake system which applies braking force to the vehicle and a shift operation that shifts an automatic transmission into a relatively lower speed or speed ratio.

2. Description of the Related Art

Technology is known that controls an automatic transmission and a brake in cooperation by operating the brake when the automatic transmission is manually shifted into a speed that will cause the engine brake to engage. One such example of this type of technology is disclosed in U.S. Pat. No. 2,503,426.

According to the technology disclosed in U.S. Pat. No. 2,503,426, when an automatic transmission (A/T) has been manually shifted so that the engine brake will engage, a brake of the vehicle is operated to prevent free running of the vehicle due to the vehicle being in a neutral state between the time that the shift starts and the time that the engine brake engages.

According to U.S. Pat. No. 2,503,426, the brakes of the vehicle are operated corresponding to a peak value of an engine negative torque during the shift obtained from the type of shift and the vehicle speed and the like, from the time that a manual downshift command is given either for a predetermined period of time or until the engine brake starts to engage (i.e., until the absolute value of the negative torque of the output shaft of the automatic transmission becomes large). Because the brakes of the vehicle are applied during the manual shift with a braking force that corresponds to the negative torque of the output shaft of the automatic transmission during the shift, a braking force is applied to the vehicle which corresponds to the amount of engine brake during the manual shift. As a result, a steady braking force is applied to the vehicle from the time the manual shift is performed until the shift is complete, such that a highly responsive and steady braking force can be obtained during the manual shift. Fluctuation in braking force is able to be reduced because the engine brake does not suddenly engage due to the brakes of the vehicle being applied while the automatic transmission is in the neutral state.

Although U.S. Pat. No. 2,503,426 does disclose technology that activates a brake in conjunction with a manual downshift when one is performed, consideration given to the control details of that braking is insufficient. The technology described in U.S. Pat. No. 2,503,426 still leaves room for improvement with respect to deceleration transitional characteristics of the vehicle.

SUMMARY OF THE INVENTION

In view of the foregoing problems, one aspect of this invention relates to a deceleration control apparatus for a vehicle, which enables a deceleration transitional characteristic of the vehicle to be improved.

That is, a deceleration control apparatus for a vehicle, which performs deceleration control such that a deceleration acting on the vehicle becomes equal to a target deceleration by an operation of a brake system which applies a braking force to the vehicle and a shift operation which shifts a transmission of the vehicle into a relatively low speed or speed ratio, is provided with a controller which, when a determination that there is a need to shift the transmission into a relatively low speed or speed ratio has been made, increases the target deceleration over time at a predetermined gradient to a predetermined value, and after the target deceleration reaches the predetermined value, maintains the target deceleration at a generally constant value.

Another aspect of the invention relates to a deceleration control method for a vehicle, by which deceleration control is performed such that a deceleration acting on the vehicle becomes equal to a target deceleration by an operation of a brake system which applies a braking force to the vehicle and a shift operation which shifts a transmission of the vehicle into a relatively low speed or speed ratio. This control method increases the target deceleration over time at a predetermined gradient to a predetermined value when a determination that there is a need to shift the transmission into a relatively low speed or speed ratio has been made, and maintains the target deceleration at a generally constant value after the target deceleration reaches the predetermined value.

As a result, this deceleration control apparatus and method for a vehicle enable a deceleration characteristic (a deceleration transitional characteristic) to be improved.

In this deceleration control, the operation of the brake system (i.e., brake control) and the shift operation (i.e., shift control) can be executed simultaneously in cooperation with each other. The deceleration here refers to the degree (amount) of vehicle deceleration represented by the deceleration or deceleration torque.

It should be noted that there is no mention in U.S. Pat. No. 2,503,426 of the initial operation gradient of the braking force (in the drawing of U.S. Pat. No. 2,503,426, the brake braking force is vertical). The initial operation gradient of the braking force greatly effects braking shock. In U.S. Pat. No. 2,503,426, the technology is only applied to a manual shift and not much consideration is given to braking shock. While braking shock should be considered even with a manual shift, it is even more important that it be considered in the case of shift point control where there is relatively little connection between the shift by the transmission and the intention to shift by the driver.

BRIEF DESCRIPTION OF THE DRAWINGS

The above-mentioned objects, features, advantages, technical and industrial significance of this invention will be better understood by reading the following detailed description of exemplary embodiments of the invention, when considered in connection with the accompanying drawings, in which:

FIG. 4 is a table showing engagement/disengagement combinations of the automatic transmission of the deceleration control apparatus for a vehicle according to the first exemplary embodiment of the invention;

DETAILED DESCRIPTION OF THE PREFERRED EMBODIMENTS

In the following description and the accompanying drawings, the present invention will be described in more detail with reference to exemplary embodiments. The first exemplary embodiment will first be described with reference to FIGS. 1 to 7. This exemplary embodiment relates to a deceleration control apparatus for a vehicle, which controls a brake system and an automatic transmission in cooperation with one another. The deceleration control apparatus for a vehicle according to this exemplary embodiment improves the deceleration transitional characteristics of the vehicle.

A vehicle may become unstable when a deceleration (i.e., a braking force) is applied to it. U.S. Pat. No. 2,503,426 described above does not disclose technology for dealing with this. Another object of this exemplary embodiment is therefore to provide a deceleration control apparatus for a vehicle that can easily control a vehicle in an unstable state.

Also, shift point control technology has recently been developed that performs a shift based on the radius of an upcoming corner, the road gradient, and the like. As opposed to a manual shift, a shift by the shift point control has relatively little to do with an intention to shift of the driver. This difference between a shift by shift point control and a manual shift must be taken into consideration when applying technology to cooperatively control the automatic transmission and brakes to a shift by shift point control. Still a further object of this exemplary embodiment is to provide a deceleration control apparatus for a vehicle that takes this difference into account.

According to this exemplary embodiment, in an apparatus for cooperatively controlling a brake system (including a brake and motor/generator) and an automatic transmission (either stepped or step-less), when a manual downshift or a downshift by shift point control is performed, two target decelerations are set: one for an initial period (a first period) during which the target deceleration has at least a gradient, and another for a second period during which the target deceleration is generally level after the first period.

A manual downshift in this case is a downshift that is performed manually when the driver wishes to increase the engine braking force. A shift by shift point control in this case is a shift that is performed based on various information such as information pertaining to the road on which the vehicle is running, including information about an upcoming corner R and the road gradient, and road traffic information pertaining to traffic on the road on which the vehicle is running, including information about the distance between vehicles.

Figure 2:
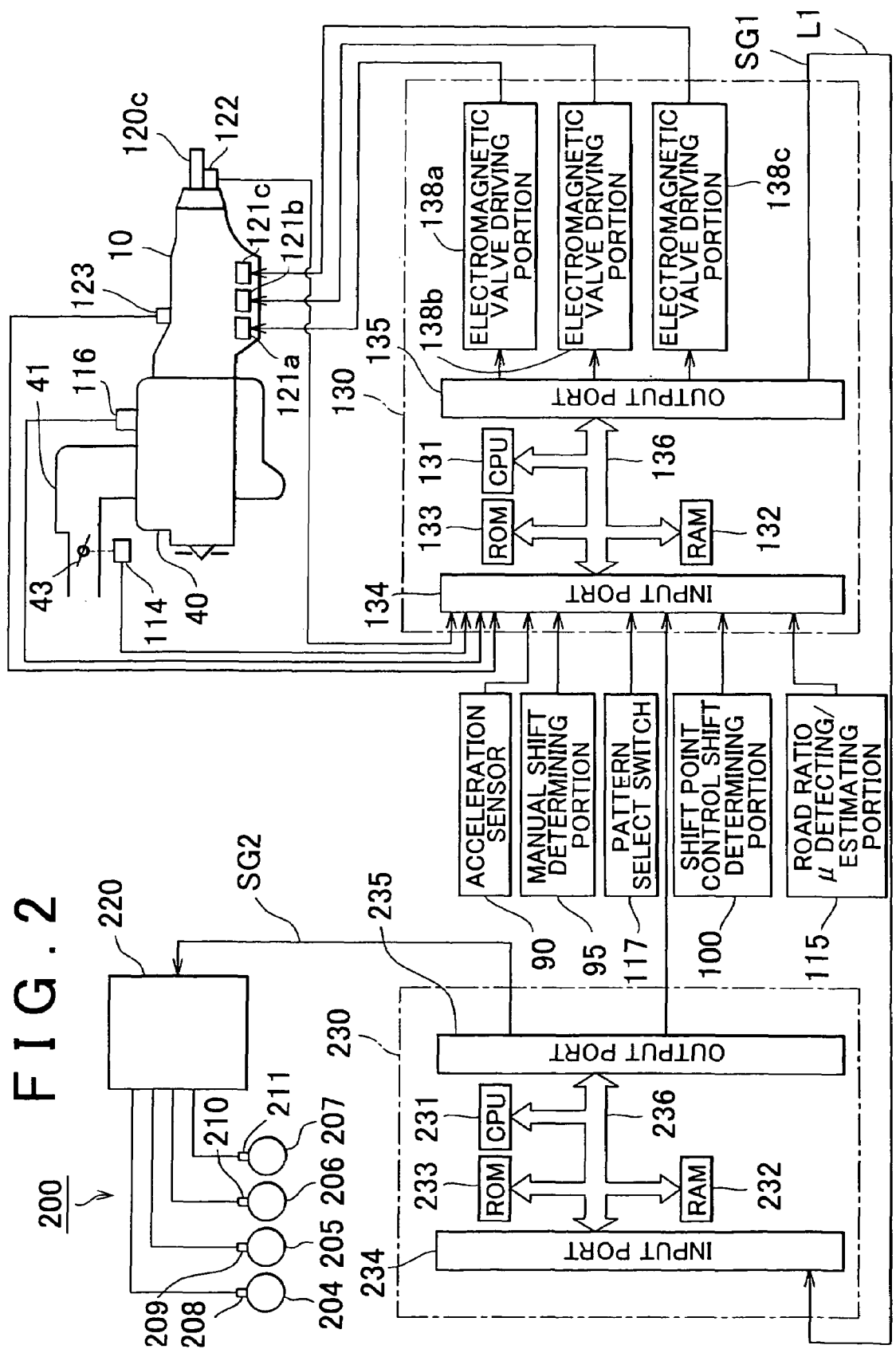
FIG. 2 is a block diagram schematically showing the deceleration control apparatus for a vehicle according to the first exemplary embodiment of the invention.

FIG. 2 shows an automatic transmission 10, an engine 40, and a brake system 200. The automatic transmission 10 is capable of achieving five speeds (1st speed to 5th speed) by controlling hydraulic pressure, which is done by energizing and de-energizing electromagnetic valves 121a, 121b, and 121c. FIG. 2 shows three electromagnetic valves 121a, 121b, and 121c, but their number is not limited to this. These electromagnetic valves 121a, 121b, and 121c are driven by signals sent from a control circuit 130.

A throttle opening amount sensor 114 detects an opening amount of a throttle valve 43 disposed inside an intake passage 41 of the engine 40. An engine speed sensor 116 detects the speed of the engine 40. A vehicle speed sensor 122 detects the rotational speed an output shaft 120c of the automatic transmission 10 in proportion to the vehicle speed. A shift position sensor 123 detects a shift position of the automatic transmission 10. A pattern select switch 117 is used when selecting a shift pattern of the automatic transmission 10.

An acceleration sensor 90 detects a deceleration of the vehicle. A manual shift determining portion 95 outputs a signal indicative of a need for a downshift (a manual downshift) or an upshift by a manual operation performed by the driver. A shift point control shift determining portion 100 outputs a signal indicative of a need for a downshift by shift point control. A road ratio μ detecting/estimating portion 115 detects or estimates a friction coefficient of the road surface (hereinafter referred to as "road ratio") μ.

The signals indicative of the various detection results from the throttle opening amount sensor 114, the engine speed sensor 116, the vehicle speed sensor 122, the shift position sensor 123, and the acceleration sensor 90 are all input to the control circuit 130. Also input to the control circuit 130 are a signal indicative of the switching state of the pattern select switch 117, a signal indicative of the detection or estimation results from the road ratio μ detecting/estimating portion 115, a signal indicative of the need to shift from the manual shift determining portion 95, and a signal indicative of the need to shift from the shift point control shift determining portion 100.

The control circuit 130 is a known micro-computer, and includes a CPU 131, RAM 132, ROM 133, an input port 134, an output port 135, and a common bus 136. Signals from the various sensors 114, 116, 122, 123, and 90, as well as signals from the pattern select switch 117, the road ratio μ detecting/estimating portion 115, the manual shift determining portion 95 and the shift point control shift determining portion 100 are all input to the input port 134. Electromagnetic valve driving portions 138a, 138b, and 138c, as well as a brake braking force signal line L1 leading to a brake control circuit 230 are all connected to the output port 135. The brake braking force signal line L1 transmits a brake braking force signal SG1.

Figure 1:
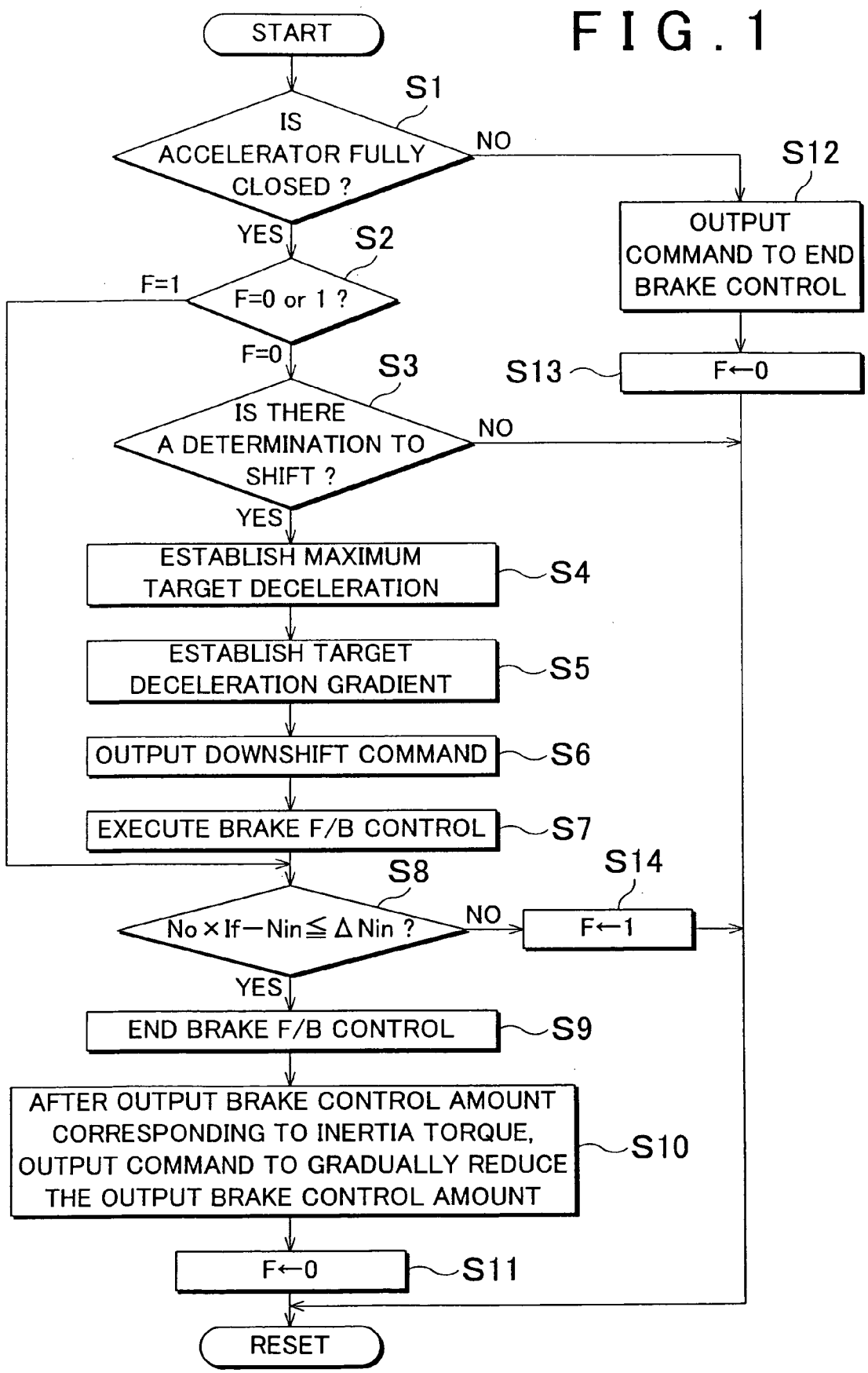
FIG. 1 is a flowchart illustrating a control by a deceleration control apparatus for a vehicle according to a first exemplary embodiment of the invention.

An operation (a control step) illustrated in the flowchart in FIG. 1, in addition to a shift map for shifting the speed of the automatic transmission 10 and an operation for shift control (not shown), are stored in the ROM 133 in advance. The control circuit 130 shifts the automatic transmission 10 based on the various control conditions that are input.

The brake system 200 is controlled by the brake control circuit 230, into which the brake braking force signal SG1 is input from the control circuit 130, so as to brake the vehicle. The brake system 200 includes a hydraulic pressure control circuit 220 and brake devices 208, 209, 210, and 211 provided on vehicle wheels 204, 205, 206, and 207, respectively. Each brake device 208, 209, 210, and 211 controls the braking force of the corresponding wheel 204, 205, 206, and 207 according to a brake hydraulic pressure which is controlled by the hydraulic pressure control circuit 220. The hydraulic pressure control circuit 220 is controlled by the brake control circuit 230.

The hydraulic pressure control circuit 220 performs brake control by controlling the brake hydraulic pressure supplied to each brake device 208, 209, 210, and 211 based on a brake control signal SG2 that ultimately determines the braking force to be applied to the vehicle. The brake control signal SG2 is generated by the brake control circuit 230 based on the brake braking force signal SG1 that the brake control circuit 230 receives from the control circuit 130 of the automatic transmission 10.

The brake control circuit 230 is a known micro-computer, and includes a CPU 231, RAM 232, ROM 233, an input port 234, an output port 235, and a common bus 236. The hydraulic pressure control circuit 220 is connected to the output port 235. The operation for generating the brake control signal SG2 based on the various data included in the brake braking force signal SG1 is stored in the ROM 233 in advance. The brake control circuit 230 controls the brake system 200 (i.e., performs brake control) based on the various control conditions that are input.

Figure 3:
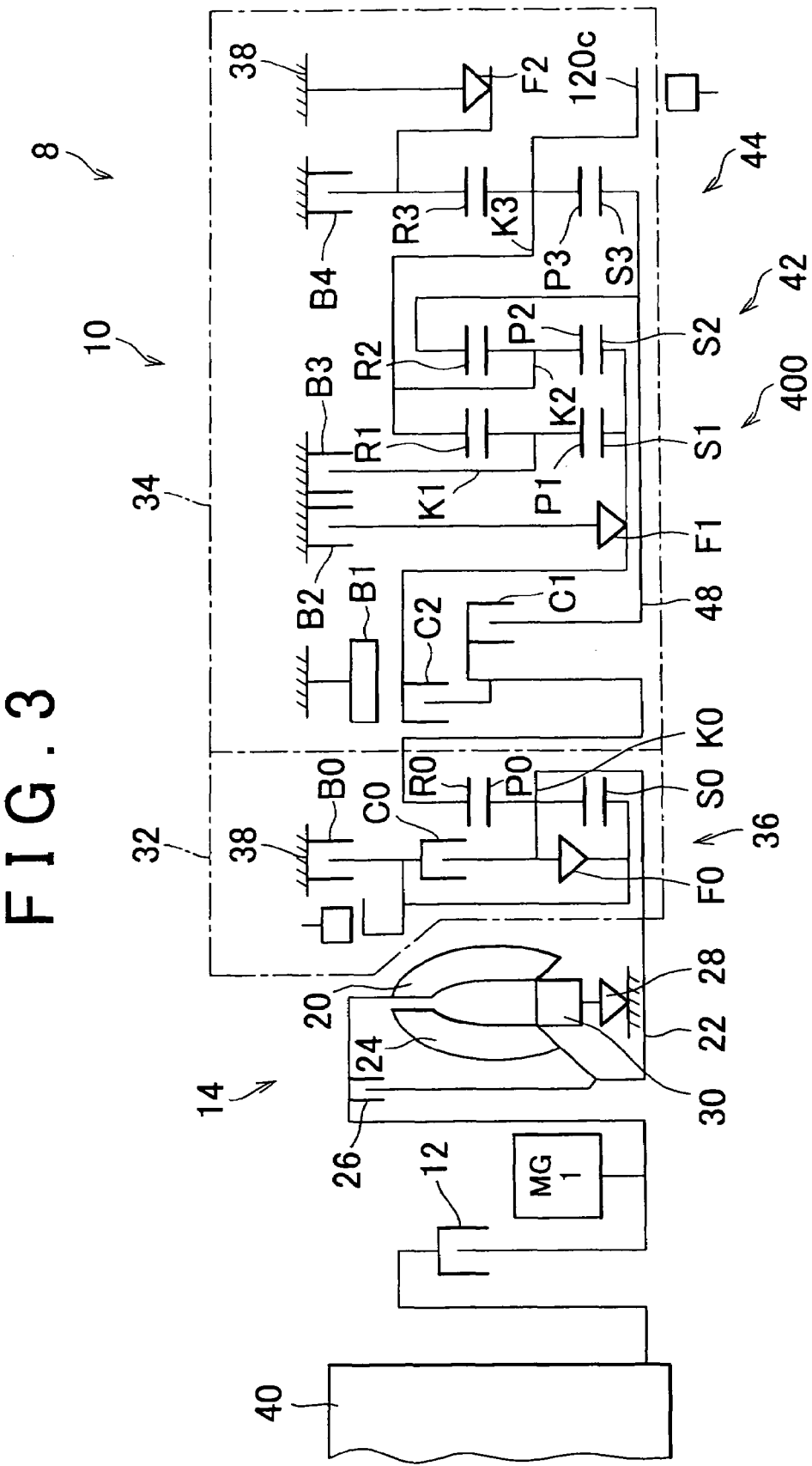
FIG. 3 is a skeleton view of an automatic transmission of the deceleration control apparatus for a vehicle according to the first exemplary embodiment of the invention.

The structure of the automatic transmission 10 is shown in FIG. 3. In the drawing, output from the engine 40, i.e., an internal combustion engine which serves as the driving source for running the vehicle, is input to the automatic transmission 10 via an input clutch 12 and a torque converter 14, which is a hydraulic power transmitting device, and transmitted to driven wheels via a differential gear unit and an axle, not shown. A first motor/generator MG1 which functions as both an electric motor and a generator is arranged between the input clutch 12 and the torque converter 14.

The torque converter 14 includes a pump impeller 20 which is coupled to the input clutch 12, a turbine runner 24 which is coupled to an input shaft 22 of the automatic transmission 10, a lock-up clutch 26 for locking the pump impeller 20 and the turbine runner 24 together, and a stator 30 that is prevented from rotating in one direction by a one-way clutch 28.

The automatic transmission 10 includes a first transmitting portion 32 which switches between a high speed and a low speed, and a second transmitting portion 34 which is capable of switching between a reverse speed and four forward speeds. The first transmitting portion 32 includes an HL planetary gearset 36, a clutch C0, a one-way clutch F0, and a brake B0. The HL planetary gearset 36 includes a sun gear S0, a ring gear R0, and planetary gears P0 that are rotatably supported by a carrier K0 and in mesh with the sun gear S0 and the ring gear R0. The clutch C0 and the one-way clutch F0 are provided between the sun gear S0 and the carrier K0, and the brake B0 is provided between the sun gear S0 and a housing 38.

The second transmitting portion 34 includes a first planetary gearset 400, a second planetary gearset 42, and a third second planetary gearset 44. The first planetary gearset 400 includes a sun gear S1, a ring gear R1, and planetary gears P1 that are rotatably supported by a carrier K1 and in mesh with the sun gear S1 and the ring gear R1. The second planetary gearset 42 includes a sun gear S2, a ring gear R2, and planetary gears P2 that are rotatably supported by a carrier K2 and in mesh with the sun gear S2 and the ring gear R2. The third planetary gearset 44 includes a sun gear S3, a ring gear R3, and planetary gears P3 that are rotatably supported by a carrier K3 and in mesh with the sun gear S3 and the ring gear R3.

The sun gear S1 and the sun gear S2 are integrally coupled together, while the ring gear R1 and the carrier K2 and the carrier K3 are integrally coupled together. The carrier K3 is coupled to the output shaft 120c. Similarly, the ring gear R2 is integrally coupled to the sun gear S3 and an intermediate shaft 48. A clutch C1 is provided between the ring gear R0 and the intermediate shaft 48, and a clutch C2 is provided between the sun gear S1 and the sun gear S2, and the ring gear R0. Also, a band brake B1 is provided on the housing 38 in order to prevent the sun gear S1 and the sun gear S2 from rotating. Further, a one-way clutch F1 and a brake B2 are provided in series between the sun gear S1 and the sun gear S2, and the housing 38. The one-way clutch F1 applies when the sun gear S1 and the sun gear S2 try to rotate in the direction opposite that of the input shaft 22.

A brake B3 is provided between the carrier K1 and the housing 38, and a brake B4 and a one-way clutch F2 are provided in parallel between the ring gear R3 and the housing 38. The one-way clutch F2 applies when the ring gear R3 tries to rotate in the direction opposite that of the input shaft 22.

The automatic transmission 10 of the above-described structure is able to switch between any of one reverse speed and five forward speeds (1st to 5th) of different speed ratios, according to the table showing engagement/disengagement combinations of the automatic transmission shown in FIG. 4, for example. In the table in FIG. 4, the single circle indicates application, a blank space indicates release, a double circle (bulls-eye) indicates application when the engine brake is engaged, and a triangle indicates application but with no power being transmitted. The clutches C0 to C2 and the brakes B0 to B4 are all hydraulic friction apply devices that are applied by hydraulic actuators.

Next, operation of the first exemplary embodiment will be described with reference to FIGS. 1 and 5.

FIG. 1 is a flowchart showing the control flow of the first exemplary embodiment. FIG. 5 is a time chart to help explain the exemplary embodiment. Input rotation speed of the automatic transmission 10, accelerator opening amount, brake control amount, clutch torque, and deceleration (G) acting on the vehicle are all indicated in the drawing.

In FIG. 1, it is determined by the control circuit 130 in step S1 whether the accelerator (i.e., the throttle opening amount) is fully closed based on the detection results of the throttle opening amount sensor 114. If the accelerator is fully closed (i.e., YES in step S1), it is determined, when there is a shift, that the shift is intended to engage the engine brake. Therefore, the brake control of the exemplary embodiment is continued in steps S2 onward. In FIG. 5, the accelerator opening amount is fully closed at time t1, as denoted by reference numeral 401.

If, on the other hand, it is determined in step S1 that the accelerator is not fully closed (i.e., NO in step S1), a command is output to end the brake control of the exemplary embodiment (step S12). When the brake control is not being executed, this state is maintained. Next in step S13, a flag F is reset to 0, after which the control flow is reset.

In step S2, the flag F is checked by the control circuit 130. Because the flag F is 0 at the start of this control flow, step S3 is executed. If the flag F is 1, however, step S8 is executed instead.

In step S3, it is determined by the control circuit 130 whether there is a determination to shift (i.e., whether there is a shift command). More specifically, it is determined whether a signal indicative of a need to shift the automatic transmission 10 into a relatively lower speed (i.e., a downshift) has been output from either the manual shift determining portion 95 or the shift point control shift determining portion 100.

Figure 5:
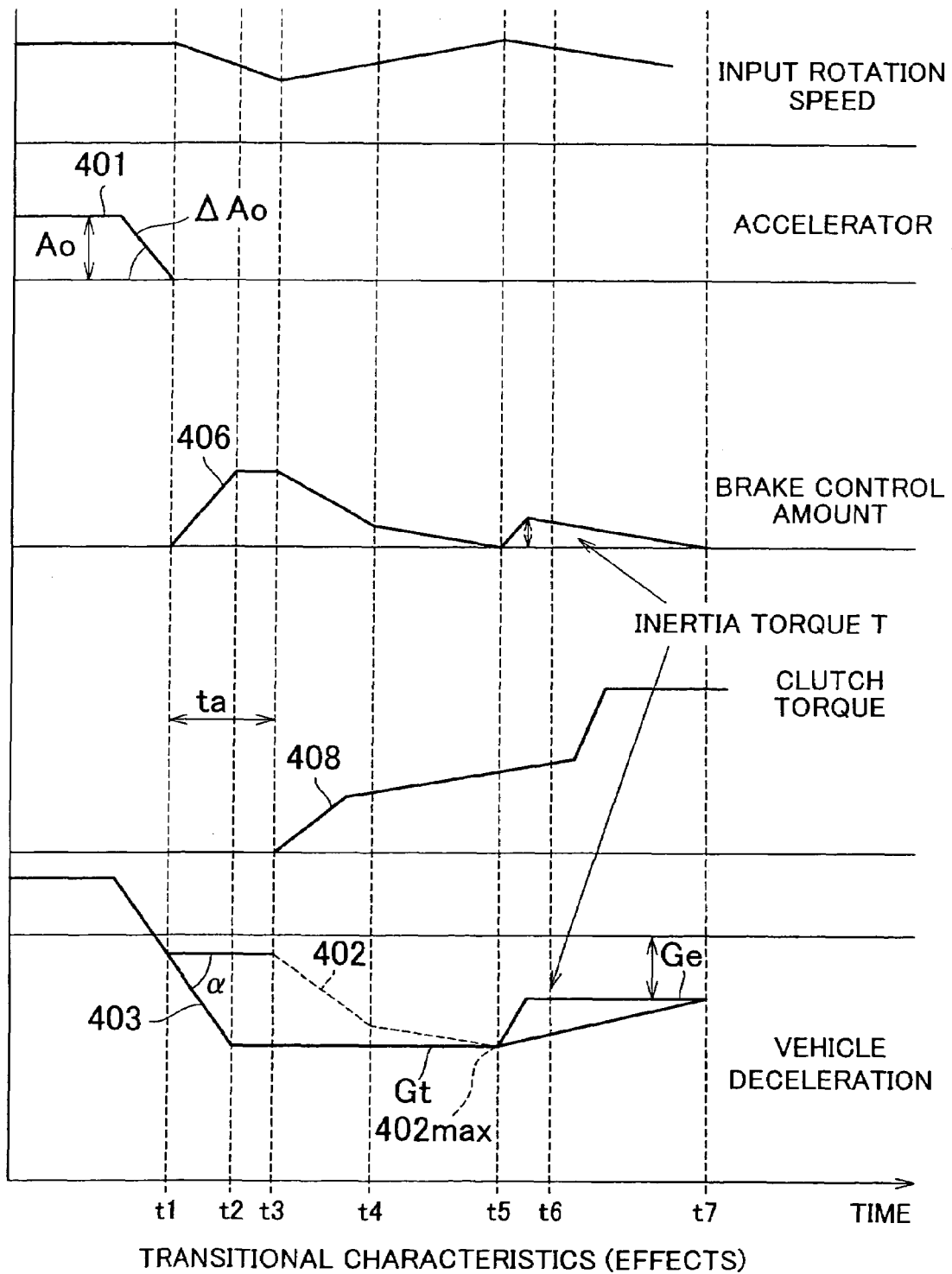
FIG. 5 is a time chart showing the deceleration transitional characteristics of the deceleration control apparatus for a vehicle according to the first exemplary embodiment of the invention.

In FIG. 5, the determination in step S3 is made at time t1. If it is determined in step S3 that a signal indicative of the need to downshift has been output from either the manual shift determining portion 95 or the shift point control shift determining portion 100 (i.e., YES in step S3), then step S4 is executed. If not (i.e., NO in step S3), the control flow is reset.

In the example described above, the accelerator is fully closed in step S1 at time t1, but it can be closed earlier, as long as it is closed before step S3 is performed at time t1. In regard to the signal indicating a need for a downshift output from the manual shift determining portion 95 or the shift point control shift determining portion 100, the example in FIG. 5 shows a case in which it has been determined by the control circuit 130 that there is a need for a downshift at time t1. Based on the determination that there is a need to downshift at time t1, the control circuit 130 then outputs a downshift command at time t1 (step S6), as will be described later.

In step S4, a maximum target deceleration Gt is obtained by the control circuit 130. This maximum target deceleration Gt is made the same (or approximately the same) as a maximum deceleration (to be described later) that is determined by the type of shift (e.g., by the combination of the speed before the shift and the speed after the shift, such as 4th→3rd or 3rd→2nd) and the vehicle speed. The broken line denoted by reference numeral 402 in FIG. 5 indicates the deceleration corresponding to the negative torque (braking force, engine brake) of the output shaft 120c of the automatic transmission 10, and is determined by the type of shift and the vehicle speed. When the deceleration is referred to in this specification, it is understood to be high when the absolute value of the deceleration is large and low when the absolute value of the deceleration is small.

The maximum target deceleration Gt is determined to be substantially the same as a maximum value (the maximum deceleration mentioned above) 402max of a deceleration 402 that acts on the vehicle from the shift of the automatic transmission 10. The maximum value 402max of the deceleration 402 from the shift of the automatic transmission 10 is determined referencing a maximum deceleration map stored in advance in the ROM 133. In the maximum deceleration map, the value of the maximum deceleration 402max is determined based on the type of shift and the vehicle speed. After step S4, step S5 is then executed.

In step S5, a gradient a of a target deceleration 403 is determined by the control circuit 130. When determining this gradient a, an initial gradient minimum value of the target deceleration 403 is first determined based on a time ta from after the downshift command is output (at time t1 in step S6, to be described later) until the shift (actually) starts (time t3), such that the deceleration that actually acts on the vehicle (hereinafter, this deceleration will be referred to as the "actual deceleration of the vehicle") will reach the maximum target deceleration Gt by time t3 when the shift starts. The time ta from time t1 when the downshift command is output until time t3 when the shift actually starts is determined based on the type of shift.

Figure 6:
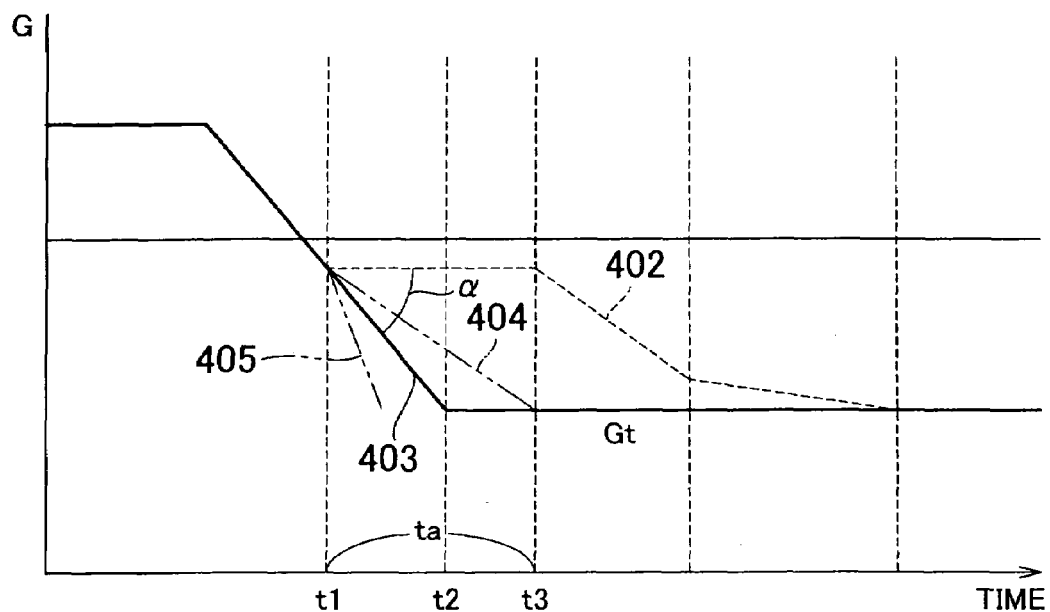
FIG. 6 is a view illustrating the gradient of the target deceleration of the deceleration control apparatus for a vehicle according to the first exemplary embodiment of the invention.

In FIG. 6, the chain double-dashed line denoted by reference numeral 404 corresponds to the initial gradient minimum value of the target deceleration. Also, a gradient upper limit value and a gradient lower limit value are set beforehand for the deceleration 403 such that shock accompanying deceleration does not become large and an instability phenomenon of the vehicle is able to be controlled (i.e., avoided). The chain double-dashed line denoted by reference numeral 405 in FIG. 6 corresponds to the gradient upper limit value.

An instability phenomenon of the vehicle refers to an unstable state of the vehicle, such as unstable behavior of the vehicle, a decrease in the degree of grip of the tires, or sliding that occurs for one reason or another such as a change in the road ratio μ or a steering operation when a deceleration (caused by brake control and/or the engine brake engaging due to a shift) acts on the vehicle.

In step S5, the gradient α of the target deceleration 403 is set larger than the gradient minimum value 404 but smaller than the gradient upper limit value 405, as shown in FIG. 6.

The initial gradient α of the target deceleration 403 sets the optimum manner of change for the deceleration in order to change the initial deceleration of the vehicle smoothly and prevent an instability phenomenon of the vehicle. The gradient α can be determined based on, for example, the rate at which the accelerator returned (hereinafter referred to as "accelerator return rate") (see ΔAo in FIG. 5) or the road ratio μ detected or estimated by the road ratio μ detecting/estimating portion 115. The gradient α can also be changed depending on whether the shift is a manual shift or a shift performed by shift point control. A detailed description of these is as follows with reference to FIG. 7.

Figure 7:
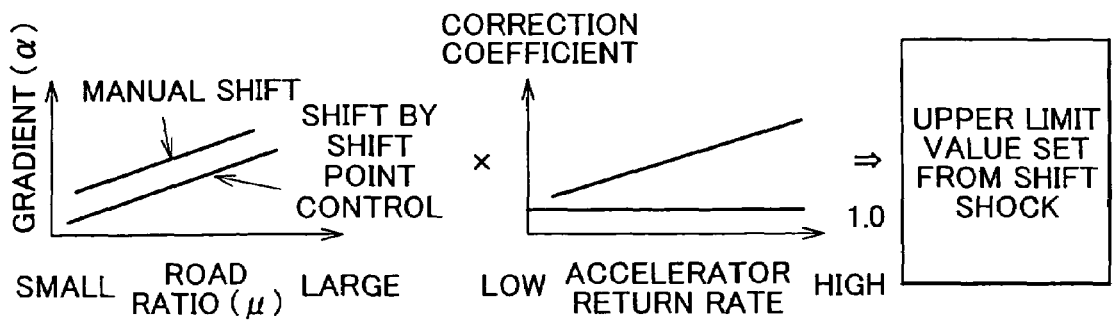
FIG. 7 is a view illustrating how the gradient of the target deceleration of the deceleration control apparatus for a vehicle is determined according to the first exemplary embodiment of the invention.

FIG. 7 shows one example of a method for setting the gradient α. As shown in the drawing, the gradient α is set smaller the smaller the road ratio μ, and larger the larger the accelerator return rate. Also, the gradient α is set smaller for a shift by shift point control than it is for a manual shift. This is because a shift by shift point control is not based directly on the intention of the driver so the rate of deceleration is set to be gradual (the deceleration is set relatively low). In FIG. 7, the relationships between the gradient α and the road ratio μ and the accelerator return rate and the like are linear, but they can also be set to be nonlinear.

A large portion (shown by the bold line in FIG. 5) of the target deceleration 403 in this exemplary embodiment is determined by steps S4 and S5. That is, as shown in FIG. 5, the target deceleration 403 is set to reach the maximum target deceleration Gt at the gradient α obtained in steps S4 and S5. Thereafter, the target deceleration 403 is maintained at the maximum target deceleration Gt until time t5 when the shift of the automatic transmission 10 ends. This is done in order to achieve a deceleration until the maximum deceleration 402max (≈maximum target deceleration Gt) produced by the shift of the automatic transmission 10 is reached, using the brakes, which have good response, while quickly suppressing deceleration shock. Realizing the initial deceleration with the brakes, which have good response, makes it possible to quickly control an instability phenomenon of the vehicle, should one occur. The setting of the target deceleration 403 after time t5 when the shift of the automatic transmission 10 ends will be described later. After step S5, step S6 is executed.

In step S6, the downshift command (shift command) is output from the CPU 131 of the control circuit 130 to the electromagnetic valve driving portions 138a to 138c. In response to this downshift command, the electromagnetic valve driving portions 138a to 138c energize or de-energize the electromagnetic valves 121a to 121c. As a result, the shift indicated by the downshift command is executed in the automatic transmission 10. If it is determined by the control circuit 130 at time t1 that there is a need for a downshift (i.e., YES in step S3), the downshift command is output at the same time as that determination (i.e., at time t1).

As shown in FIG. 5, when a downshift command is output at time t1 (step S6), the shift of the automatic transmission 10 actually starts at time t3, after the time ta determined based on the type of shift has passed after time t1. When the shift starts, clutch torque 408 starts to increase, as does the deceleration 402 from the shift of the automatic transmission 10. After step S6, step S7 is executed.

In step S7, a brake feedback control is executed by the brake control circuit 230. As is shown by reference numeral 406, the brake feedback control starts at time t1 when the downshift command is output.

That is, a signal indicative of the target deceleration 403 is output as the brake braking force signal SG1 at time t1 from the control circuit 130 to the brake control circuit 230 via the brake braking force signal line L1. Then based on the brake braking force signal SG1 input from the control circuit 130, the brake control circuit 230 then generates the brake control signal SG2 and outputs it to the hydraulic pressure control circuit 220.

The hydraulic pressure control circuit 220 then generates a braking force (a brake control amount 406) as indicated by the brake control signal SG2 by controlling the hydraulic pressure supplied to the brake devices 208, 209, 210, and 211 based on the brake control signal SG2.

In the feedback control of the brake system 200 in step S7, the target value is the target deceleration 403, the control amount is the actual deceleration of the vehicle, the objects to be controlled are the brakes (brake devices 208, 209, 210, and 211), the operating amount is the brake control amount 406, and the disturbance is mainly the deceleration 402 caused by the shift of the automatic transmission 10. The actual deceleration of the vehicle is detected by the acceleration sensor 90.

That is, in the brake system 200, the brake braking force (i.e., brake control amount 406) is controlled so that the actual deceleration of the vehicle comes to match the target deceleration 403. That is, the brake control amount 406 is set so that, when producing the target deceleration 403 in the vehicle, it produces a deceleration that makes up for the difference between the deceleration 402 caused by the shift of the automatic transmission 10 and the target deceleration 403 in the vehicle.

In the example shown in FIG. 5, the deceleration 402 caused by the automatic transmission 10 is zero from time t1 when the downshift command is output until time t3 when the automatic transmission actually starts to shift. Therefore, the brake control amount 406 is set such that the deceleration matches the entire target deceleration 403 using the brakes. From time t3 the automatic transmission 10 starts to shift, and the brake control amount 406 decreases as the deceleration 402 caused by the automatic transmission 10 increases.

In step S8, the control circuit 130 determines whether the shift of the automatic transmission 10 is ending (or close thereto). This determination is made based on the rotation speed of rotating members in the automatic transmission 10 (see input rotation speed in FIG. 5). In this case, it is determined according to whether the following relational expression is satisfied.

$$No \times If - Nin \leq \Delta Nin$$

Here, No is the rotation speed of the output shaft 120c of the automatic transmission 10, Nin is the input shaft rotation speed (turbine rotation speed etc.), If is the speed ratio after the shift, and $\Delta Nin$ is a constant value. The control circuit 130 inputs the detection results from a detecting portion (not shown) that detects the input shaft rotation speed Nin of the automatic transmission 10 (i.e., the turbine rotation speed of the turbine runner 24, etc.).

If that relational expression is not satisfied in step S8, it is determined that the shift of the automatic transmission 10 is not yet ending and the flag F is set to 1 in step S14, after which the control flow is reset. The routine then repeats steps S1, S2, and S8 until that relational expression is satisfied. If during that time the accelerator opening amount is anything other than fully closed, the routine proceeds to step S12 and the brake control according to this exemplary embodiment ends.

If, on the other hand, the foregoing relational expression in step S8 is satisfied, the routine proceeds on to step S9. In FIG. 5, the shift ends at (right before) time t5, whereby the relational expression is satisfied. As can be seen in FIG. 5, the deceleration 402 that acts on the vehicle from the shift of the automatic transmission 10 reaches the maximum value 402max (≈maximum target deceleration Gt) at time t5, indicating that the shift of the automatic transmission 10 has ended.

In step S9, the brake feedback control that started in step S7 ends. After step S9, the control circuit 130 no longer includes the signal corresponding to the brake feedback control in the brake braking force signal SG1 that is output to the brake control circuit 230.

That is, the brake feedback control is performed until the shift of the automatic transmission 10 ends. As shown in FIG. 5, the brake control amount 406 is zero at time t5 when the shift of the automatic transmission 10 ends. When the shift of the automatic transmission 10 ends at time t5, the deceleration 402 produced by the automatic transmission 10 reaches the maximum value 402max. At that time t5, the deceleration 402 alone produced by the automatic transmission 10 is sufficient to reach the maximum target deceleration Gt of the target deceleration 403 set (in step S4) to be substantially the same as the maximum value 402max of the deceleration 402 produced by the automatic transmission 10, so the brake control amount 406 can be zero. After step S9, step S10 is executed.

In step S10, the control circuit 130 outputs, and then gradually reduces, the brake torque (deceleration) for the amount of shift inertia to the brakes via the brake braking force signal SG1 that is output to the brake control circuit 230. The shift inertia is generated from between times t5 and t6 after the shift of the automatic transmission 10 has ended, through time t7 in FIG. 5. The shift inertia (i.e., inertia torque) is determined by a time derived value and an inertia value of a rotation speed of a rotating member of the automatic transmission 10 at time t5 when the shift of the automatic transmission 10 has ended.

In FIG. 5, step S10 is executed between time t5 and time t7. In order to keep shift shock to a minimum, the control circuit 130 sets the target deceleration 403 so its gradient is gradual after time t5. The gradient of the target deceleration 403 remains gradual until the target deceleration 403 reaches a final deceleration Ge obtained by a downshift of the automatic transmission 10. The setting of the target deceleration 403 ends when it reaches the final deceleration Ge. At that point, the final deceleration Ge, which is the engine brake desired by the downshift, acts on the vehicle as the actual deceleration of the vehicle, so from that point on, brake control according to the exemplary embodiment is no longer necessary.

In step S10, the brake control amount 406 for the shift inertia amount is supplied by the hydraulic pressure control circuit 220 in response to the brake control signal SG2 generated based on the brake braking force signal SG1 that was input to the brake control circuit 230. Then the brake control amount 406 is gradually reduced to correspond to the gradient of the target deceleration 403. After step S10, step S11 is executed.

In step S11, the control circuit 130 clears the flag F to 0 and resets the control flow.

This exemplary embodiment enables ideal deceleration transitional characteristics to be obtained, as shown by the target deceleration 403 in FIG. 5. The deceleration smoothly shifts from the driven wheels to the non-driven wheels. Thereafter as well, the deceleration smoothly shifts to the final deceleration Ge obtained by a downshift of the automatic transmission 10. These ideal deceleration transitional characteristics are further described below.

That is, immediately after it is confirmed (i.e., immediately after there has been a determination) that there is a need for a downshift in step S3 (time t1), the brake control (step S7) that starts upon that confirmation (i.e., at time t1) causes the actual deceleration of the vehicle to gradually increase both at a gradient a that does not produce a large deceleration shock and within a range in which it is still possible to control a vehicle instability phenomenon should one occur. The actual deceleration of the vehicle increases until it reaches the maximum value 402max (≈maximum target deceleration Gt) of the deceleration 402 produced by the shift before time t3 when the shift starts. The actual deceleration of the vehicle then gradually falls, without producing a large shift shock at the end of the shift (after time t5), until it reaches the final deceleration Ge obtained by the shift.

As described above, according to this exemplary embodiment, the actual deceleration of the vehicle starts to increase quickly, i.e., immediately after time t1 when it has been confirmed that there is a need for a downshift. The actual deceleration of the vehicle then gradually increases until it reaches, at time t2 before time t3 when the shift starts, the maximum value 402max (≈maximum target deceleration Gt) of the deceleration 402 produced by the shift. The actual deceleration of the vehicle is then maintained at the maximum target deceleration Gt until time t5 when the shift ends. If an instability phenomenon is going to occur in the vehicle from a temporal shift in the actual deceleration of the vehicle, as described above, it is highly likely that it will occur either while the actual deceleration of the vehicle is increasing to the maximum target deceleration Gt (between time t1 and time t2), or at the latest, by time t3 before the shift starts immediately after the actual deceleration of the vehicle has reached the maximum target deceleration Gt. During this period when it is highly likely that a vehicle instability phenomenon will occur, only the brakes are used to produce a deceleration (that is, the automatic transmission 10 which has not yet actually started to shift is not used to produce a deceleration). Because the brakes have better response than the automatic transmission, an instability phenomenon in the vehicle, should one occur, can be both quickly and easily controlled by controlling the brakes.

That is, the brakes can be quickly and easily controlled to reduce or cancel the brake braking force (i.e., the brake control amount 406) in response to an instability phenomenon of the vehicle. On the other hand, if an instability phenomenon occurs in the vehicle after the automatic transmission has started to shift, even if the shift is cancelled at that point, it takes time until the shift is actually cancelled.

Further, during the period mentioned above when the likelihood that an instability phenomenon will occur in the vehicle is high (i.e., from time t1 to time t2 or from time t1 to time t3), the automatic transmission 10 does not start to shift and the friction apply devices such as the clutches and brakes of the automatic transmission 10 are not applied, so no problem will result if the shift of the automatic transmission 10 is cancelled in response to the occurrence of an instability phenomenon in the vehicle.

A second exemplary embodiment of the invention will now be described with reference to FIGS. 8 to 10. In the following description of the second exemplary embodiment, only those parts that differ from the first exemplary embodiment will be described; descriptions of parts that are the same as those in the first exemplary embodiment will be omitted.

The first exemplary embodiment as described above can be used for both a case of a manual shift and a case of a shift by shift point control. The second exemplary embodiment, however, assumes only a case in which the shift is done by shift point control.

Figure 8:
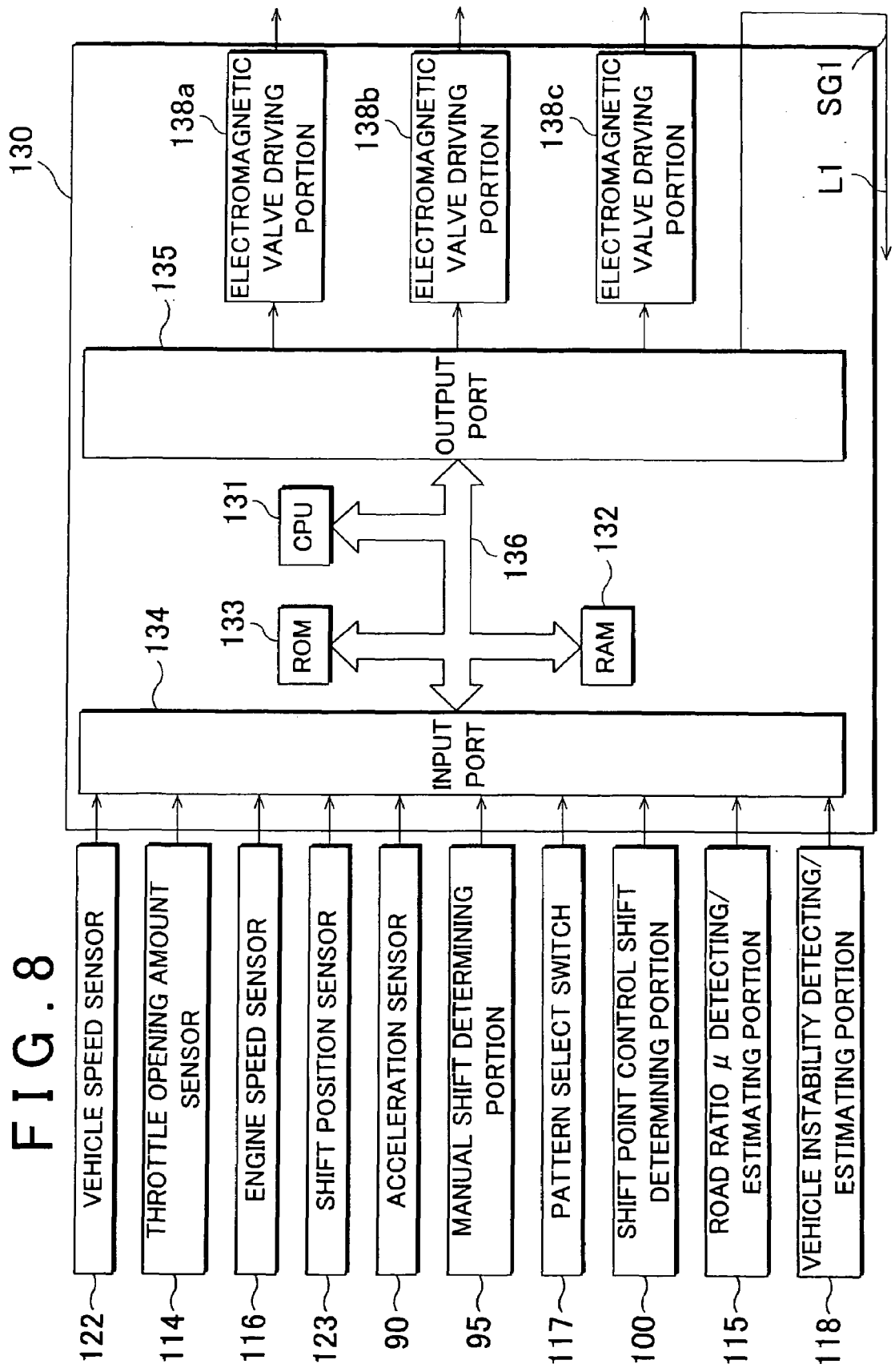
FIG. 8 is a block diagram schematically showing peripheral devices around a control circuit of a deceleration control apparatus for a vehicle according to a second exemplary embodiment of the invention.

FIG. 8 is a block diagram schematically showing the peripheral devices of the control circuit 130 according to the second exemplary embodiment. In the second exemplary embodiment, a vehicle instability detecting/estimating portion 118, which detects when the vehicle is unstable or estimates or anticipates that the vehicle will become unstable, is connected to the control circuit 130.

The vehicle instability detecting/estimating portion 118 detects, estimates, or anticipates an unstable state of the vehicle (a state in which the braking force/deceleration should be reduced), such as a decrease in the degree of grip of the tire, sliding, or unstable behavior, that has occurred or will occur for one reason or another (including a change in the road ratio μ and a steering operation). The following describes an example in which the vehicle instability detecting/estimating portion 118 detects or estimates a decrease in the degree of tire grip and control according to this exemplary embodiment is executed based on those detection or estimation results.

Figure 9A:
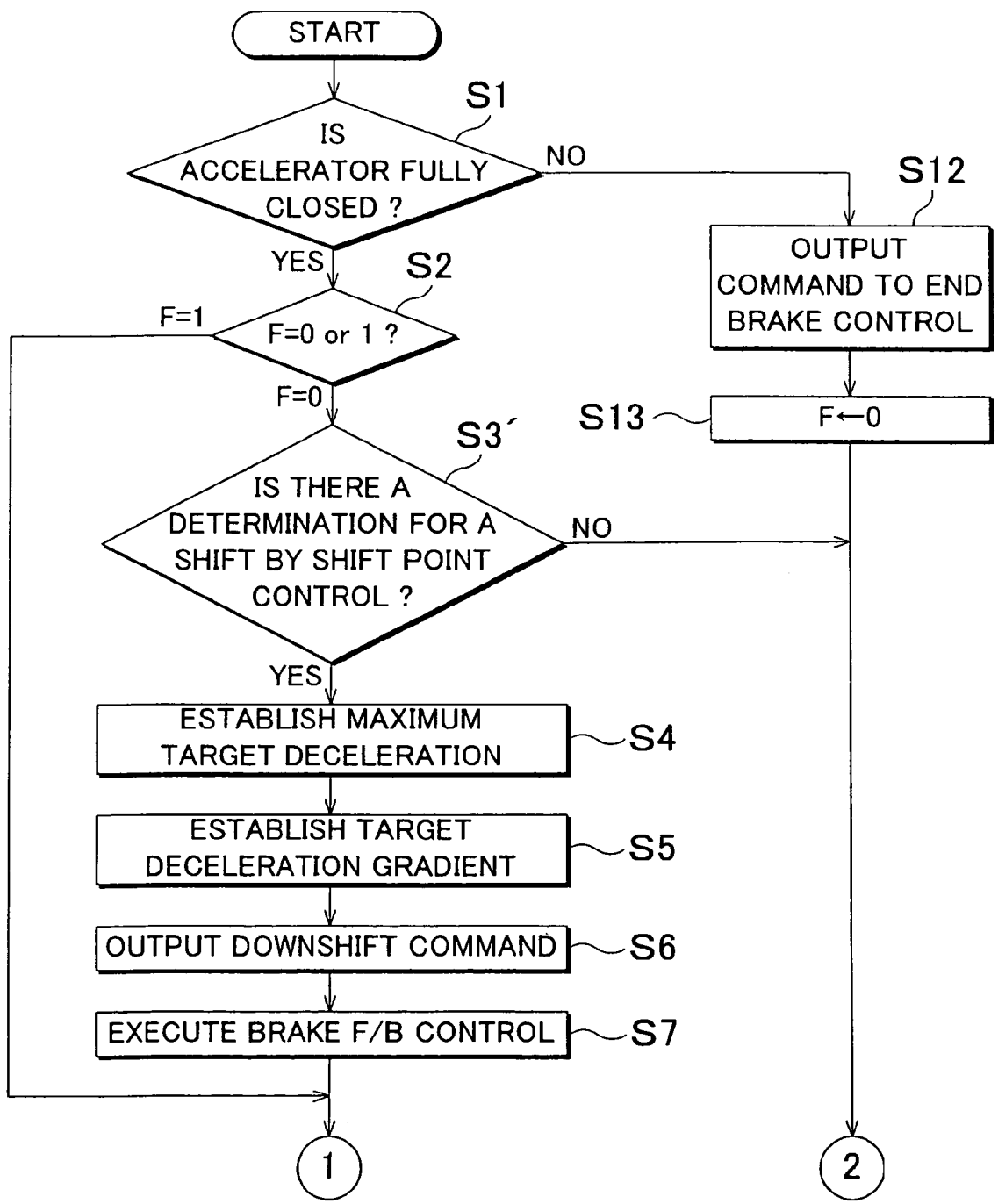
FIGS. 9A and 9B are flowcharts illustrating control by the deceleration control apparatus for a vehicle according to the second exemplary embodiment of the invention.
Figure 9B:
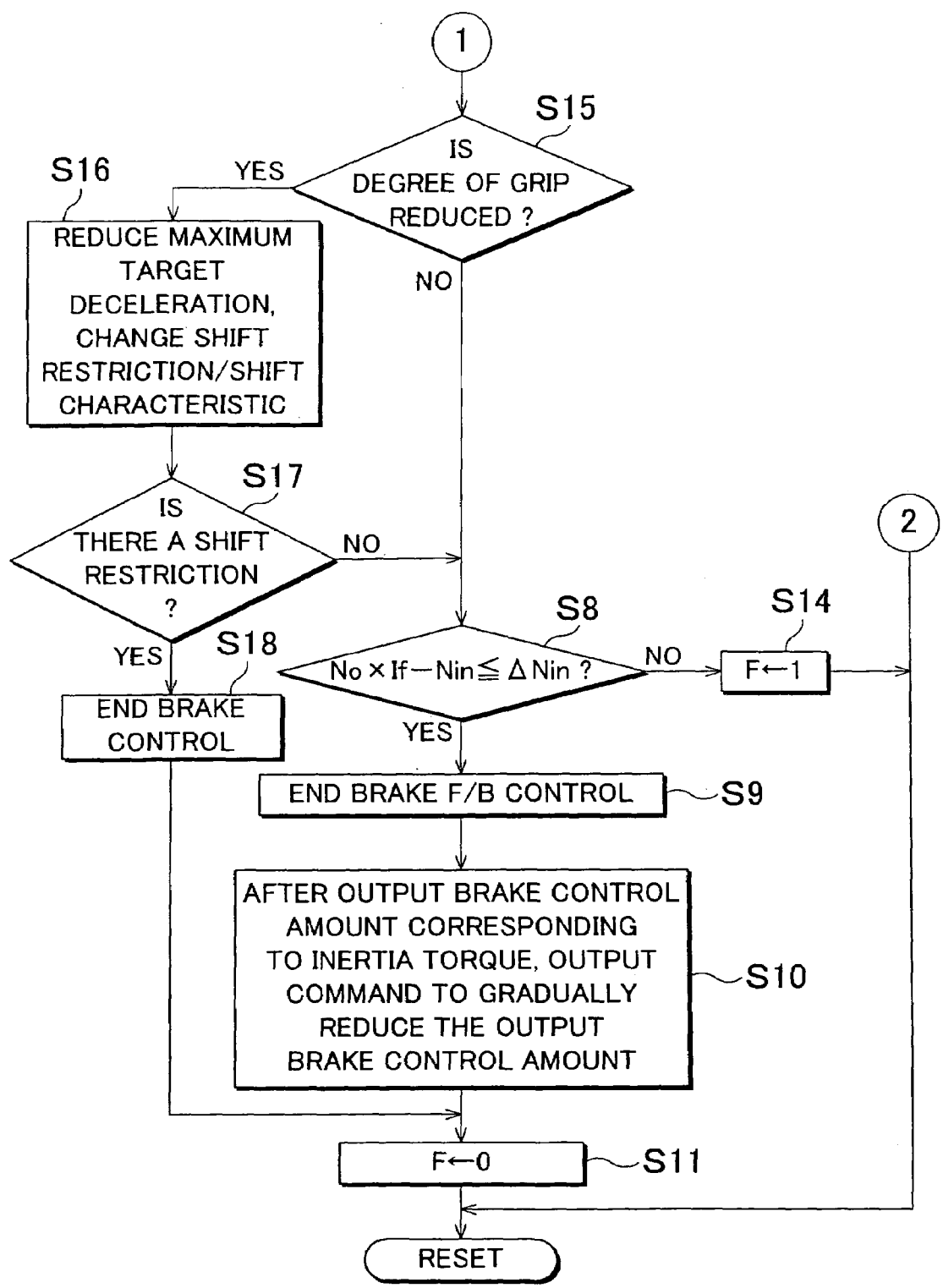

FIGS. 9A and 9B are flowcharts showing the control flow according to the second exemplary embodiment. This operation is stored in advance in the ROM 133. As shown in the drawing, the control flow of the second exemplary embodiment differs from the control flow (FIG. 1) of the first exemplary embodiment in that steps S15 to S17 have been added. Furthermore, step S3' in FIG. 9A differs from step S3 in FIG. 1 in that, in step S3' in FIG. 9A, it is determined whether a command has been output for a downshift by shift point control.

A shift according to shift point control is not a downshift based on an intention originating in the driver, as is a manual shift. Therefore, even if a deceleration caused by the downshift (including both a deceleration caused by brake control and a deceleration caused by the shift (engine brake)) is corrected, that correction does not immediately contradict the intention of the driver.

Thus, according to this exemplary embodiment, when deceleration control (steps S3, S6, and S7) is executed in response to a downshift by shift point control, the deceleration is corrected (step S16) so that it is reduced when it is desirable to reduce the braking force/deceleration, such as when the degree of tire grip is low (i.e., YES in step S15).

The control flow of the second exemplary embodiment will now be described with reference to FIGS. 9A, 9B and 10. Steps S1, S2, S4, S5, and S7 to S14 are the same as in the first exemplary embodiment so a description of these steps will be omitted.

In step S3', the control circuit 130 determines whether a signal indicative of the need to downshift is being output from the shift point control shift determining portion 100. The FIG. 10 shows an example similar to that in FIG. 5, in which there has been a determination that there is a need to downshift by shift point control at time t1. When it has been determined in step S3' that there is a need to downshift based on the signal from the shift point control shift determining portion 100 (i.e., YES in step S3'), the maximum target deceleration Gt is determined (step S14) and the gradient α of the target deceleration 403 is determined (step S5), after which step S6 is executed, just as in the first exemplary embodiment.

In step S6, a command for a downshift according to shift point control is output from the CPU 131 of the control circuit 130 to the electromagnetic valve driving portions 138a to 138c at time t1. Thereafter, brake feedback control is executed (step S7) at time t1 just as in the first exemplary embodiment. After step S7, step S15 is executed.

In step S15, the vehicle instability detecting/estimating portion 118 determines whether the degree of grip is less than a predetermined value. If it is determined that the degree of grip is less than the predetermined value (i.e., YES in step S15), the control circuit 130 reduces the maximum target deceleration Gt (step S16).

Figure 10:
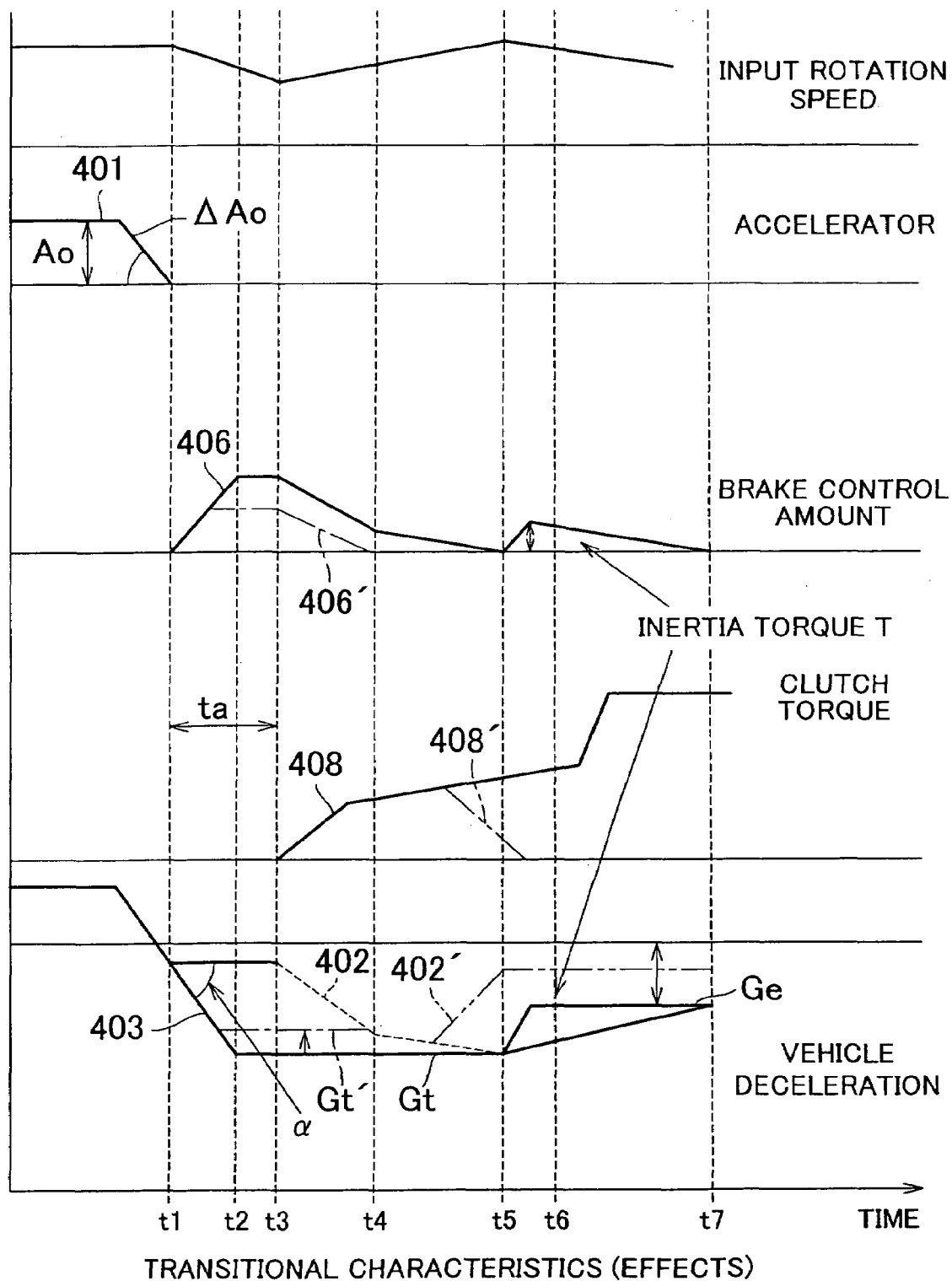
FIG. 10 is time chart showing the deceleration transitional characteristics of the deceleration control apparatus for a vehicle according to the second exemplary embodiment of the invention.

In FIG. 10, a maximum target deceleration Gt', which is the maximum target deceleration Gt after being reduced in step S16, is shown by an alternate long and short dash line denoted by reference numeral 406'. As a result of reducing the maximum target deceleration Gt in step S16, the brake control amount 406 according to the brake feedback control that started in step S7 decreases, as shown by that alternate long and short dash line 406'.

In step S16, the control circuit 130 changes the shift restriction or shift transitional characteristics when necessary at the same time that the maximum target deceleration Gt is being reduced. A shift restriction refers to, for example, canceling the downshift in a case where the shift involves only one speed, and reducing the number of speeds to be shifted into by at least one in a case where a plurality of shifts are to be performed into two or more speeds.

A shift (in the case of a plurality of shifts into two or more speeds, only a shift in which the deceleration is larger than the maximum target deceleration Gt') can be canceled if necessary when the deceleration 402 caused by the shift of the automatic transmission 10 is larger than the maximum target deceleration Gt' resulting from step S16, as shown in FIG. 10. Accordingly, the shift transitional characteristics can be changed.

In the example in FIG. 10, the deceleration 402 caused by the shift of the automatic transmission 10 is larger than the maximum target deceleration Gt' so the shift of the automatic transmission 10 is cancelled. The deceleration caused by the automatic transmission 10 following that cancellation is shown by the chain double-dashed line denoted by reference numeral 402'. When the shift is cancelled, the deceleration 402' caused by the shift of the automatic transmission 10 decreases, returning to the deceleration before the start of the shift. Also, when the shift of the automatic transmission 10 is cancelled, the clutch torque 408 of the automatic transmission 10 decreases, as shown by the chain double-dashed line denoted by reference numeral 408'.

In step S17, the control circuit 130 determines whether a shift restriction has been imposed in step S16. If a shift restriction has been imposed (i.e., YES in step S17), brake control following the shift is unnecessary so it ends (step S18) and the flag F is reset to 0 (step S11). If, on the other hand, it is determined in step S17 that a shift restriction has not been imposed (i.e., NO in step S17), step S8 is executed. Steps S8 onward are the same as in the first exemplary embodiment so descriptions thereof will be omitted here.

According to the second exemplary embodiment, when an instability phenomenon (such as a reduction in the degree of slip) has been detected, estimated, or anticipated in the vehicle (i.e., YES in step S15) when a downshift by shift point control is performed (step S6) and brake control corresponding to that downshift is performed (step S7), the maximum target deceleration Gt in FIG. 10 can be changed to a small value Gt', as shown by the alternate long and short dashed line. As a result, the brake control amount 406 becomes a small value 406', as shown by the alternate long and short dashed line. Also, when the deceleration 402 caused by the automatic transmission 10 exceeds the maximum target deceleration Gt' following a downshift (step S6) of the automatic transmission 10 by shift point control, that shift can be cancelled if necessary (see the chain double-dashed line 402' that branches off from the line denoted by the reference numeral 402 in FIG. 10).

From the description above, according to the second exemplary embodiment, when an instability phenomenon in the vehicle has occurred, or when it is anticipated that an instability phenomenon in the vehicle will occur, the actual deceleration of the vehicle decreases, making it easier to eliminate an instability phenomenon in the vehicle, prevent one from becoming worse, or prevent one from occurring in the first place. In the above description, when a shift restriction is imposed (i.e., YES in step S17), the brake control ends at that point (see brake control amount 406' when the shift is cancelled).

Next, a third exemplary embodiment of the invention will be described with reference to FIGS. 11 and 12. In the following description of the third exemplary embodiment, only those parts that differ from the foregoing exemplary embodiments will be described; descriptions of parts that are the same as those in the foregoing exemplary embodiments will be omitted.

The third exemplary embodiment assumes a downshift by shift point control, just like the second exemplary embodiment. The third exemplary embodiment, however, goes farther into the detail with step S16 of the second exemplary embodiment.

Figure 11:
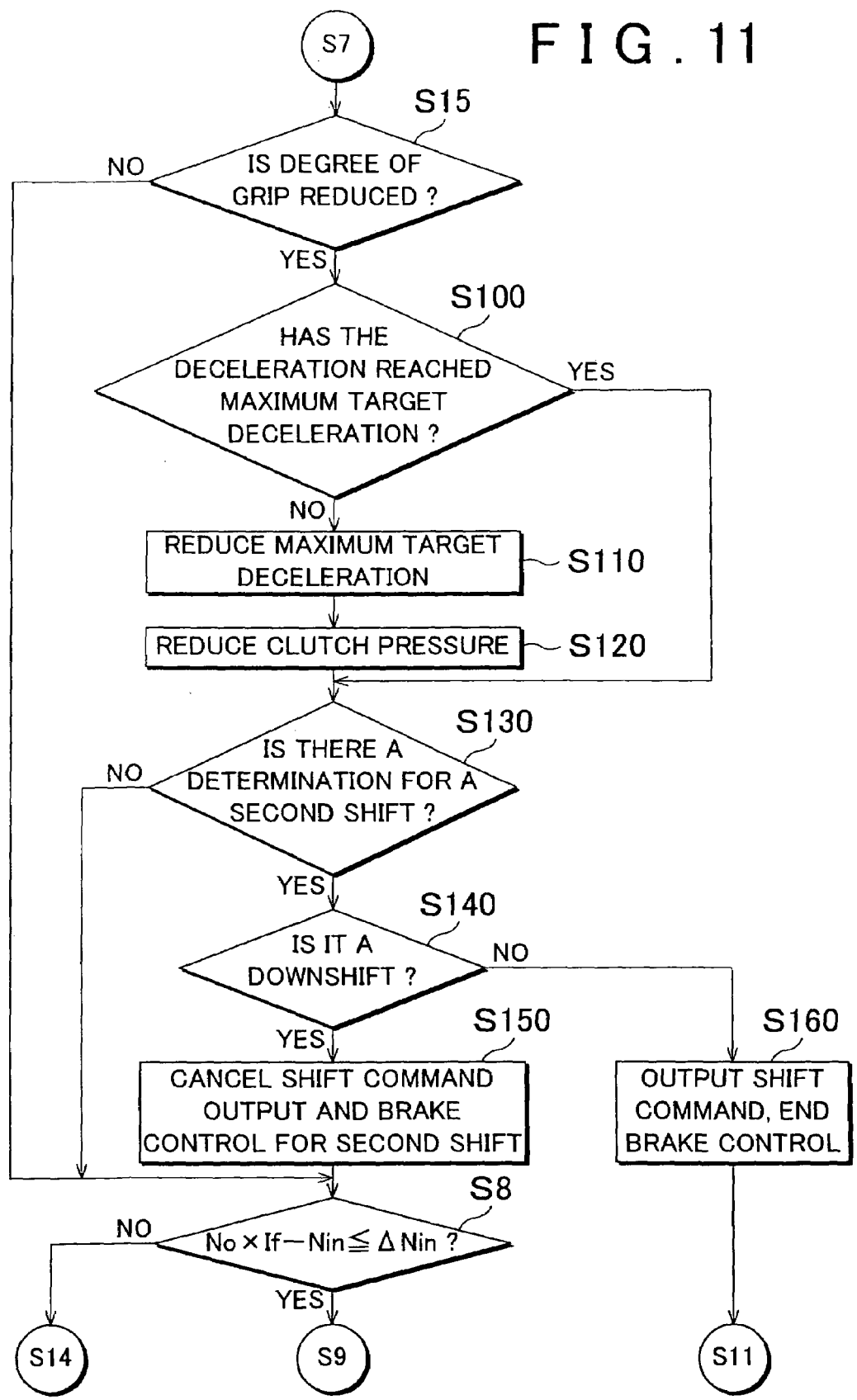
FIG. 11 is a flowchart illustrating a control by a deceleration control apparatus for a vehicle according to a third exemplary embodiment of the invention.

FIG. 11 is a flowchart showing the control flow of the third exemplary embodiment. The operation of the control flow is stored in advance in the ROM 133. FIG. 11 differs from FIGS. 9A and 9B showing the control flow of the second exemplary embodiment in two ways. First, steps S100 to S160 have been added between step S15 and step S8. Second, steps S17 and S18 in FIG. 9B have been omitted (as they correspond to steps S150 and S160) in FIG. 11. Steps S1 to S15 in FIG. 11 are the same as in the foregoing exemplary embodiment, so descriptions thereof will be omitted.

Step S100 is executed when the degree of grip becomes less than a predetermined value (i.e., YES in step S15) after a downshift by shift point control is performed at time t1 (step S6) and brake feedback control has started (step S7). In step S100, the control circuit 130 determines whether the target deceleration 403 or the actual deceleration of the vehicle has reached the maximum target deceleration Gt at the current point.

Figure 12:
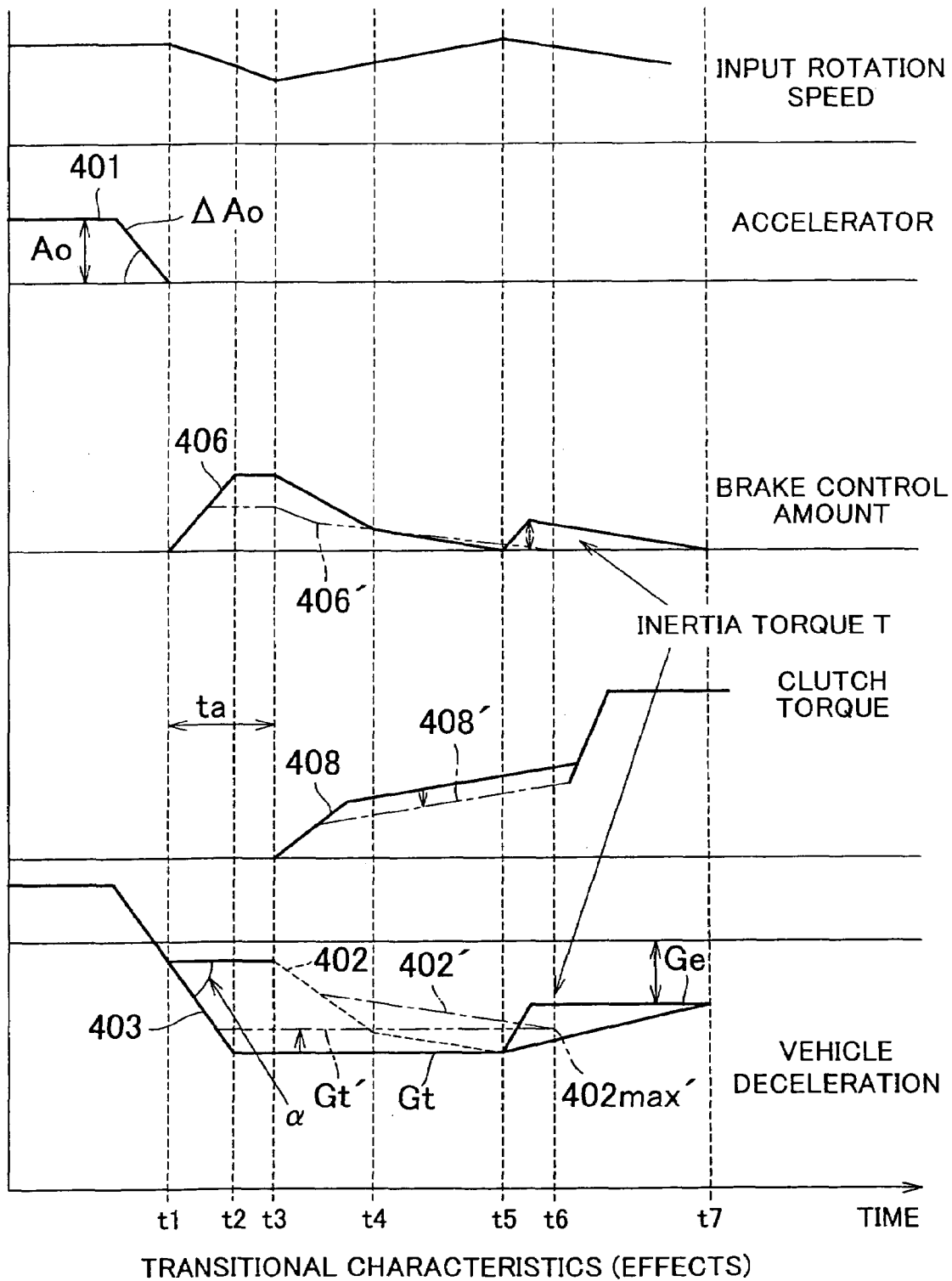
FIG. 12 is a time chart showing the deceleration transitional characteristics of the deceleration control apparatus for a vehicle according to the third exemplary embodiment of the invention.

In the example in FIG. 12, before time t2, the target deceleration 403 or the actual deceleration of the vehicle is still sweeping down at the gradient α and has not yet reached the maximum target deceleration Gt, so the determination in step S100 is NO. In this case, step S110 is then executed. After time t2, on the other hand, the target deceleration 403 or the actual deceleration of the vehicle has reached the maximum target deceleration Gt, so the determination in step S100 is YES. In this case, step S130 is executed. That is, if the target deceleration 403 or the actual deceleration of the vehicle has reached the maximum target deceleration Gt (i.e., YES in step S100), the target deceleration 403 or the actual deceleration of the vehicle will not increase anymore so the routine proceeds directly on to step S130 without executing steps S110 and S120, which will be described next.

In step S110, the control circuit 130 reduces the maximum target deceleration Gt. More specifically, the value of the maximum target deceleration Gt reduced in step S110 (i.e., the value of the maximum target deceleration Gt') is determined as follows. That is, because the degree of grip is reduced (step S15) while the target deceleration 403 or the actual deceleration of the vehicle is still increasing over time (i.e., NO in step S100) when step S110 is executed, the value of the target deceleration 403 or the actual deceleration of the vehicle at the point when step S110 is executed is made the new maximum target deceleration Gt'. After step S110, step S120 is executed.

In step S120, the control circuit 130 reduces the hydraulic pressure (clutch pressure) operating a clutch of the automatic transmission 10 by a predetermined value. More specifically, the control circuit 130 reduces the clutch pressure by controlling the operating states of the electromagnetic valves 121a to 121c using the electromagnetic valve driving portions 138a to 138c.

The deceleration caused by a shift of the automatic transmission 10 when the clutch pressure is reduced is denoted by reference numeral 402'. When the clutch pressure is reduced, the time required for the shift increases (to time t6) and the maximum value 402max' of the deceleration 402' caused by the shift decreases. In step S120, the decrease amount of the clutch pressure is a value corresponding to the decrease amount of the maximum target deceleration Gt'. As a result, the maximum target deceleration Gt' and deceleration of the maximum value 402max' of the deceleration 402' caused by the shift of the automatic transmission 10 are equal, as shown in FIG. 12.

Because step S120 is executed when the target deceleration 403 or the actual deceleration of the vehicle has not yet reached the maximum target deceleration Gt (i.e., before time t2) (i.e., NO in step S100), step S120 is executed before time t3 when the automatic transmission 10 actually starts to shift. As a result, the clutch pressure of the automatic transmission 10 can easily be reduced in step S120.

The brake control amount changes in response to a decrease in the maximum target deceleration Gt' and a decrease in the clutch pressure (i.e., in response to a change in the deceleration 402' caused by the shift of the automatic transmission 10), as shown by reference numeral 406'. Also, the clutch torque decreases in response to a decrease in clutch pressure, as shown by reference numeral 408'. After step S120, step S130 is executed.

In step S130, the control circuit 130 determines whether a determination has been made for a second shift while the current shift operation (hereinafter referred to as the "first shift") is being performed. That is, the control circuit 130 determines whether a signal indicative of a need for a second shift, which is different from the first shift, is being output from either the manual shift determining portion 95 or the shift point control shift determining portion 100.

If it is determined that the signal indicative of a need for the second shift is being output (i.e., YES in step S130), step S140 is then executed. If, on the other hand, it is determined that the signal indicative of a need for the second shift is not being output (i.e., NO in step S130), step S8 is executed. Steps S8 onward are the same as those in the foregoing exemplary embodiment so descriptions thereof will be omitted here.

In step S140, the control circuit 130 determines whether the second shift is a downshift. If it is a downshift (i.e., YES in step S140), then step S150 is executed. If not (i.e., NO in step S140), i.e., if it is an upshift, then step S160 is executed.

In step S150, the control circuit 130 cancels both the downshift command corresponding to the signal indicating a need for the second shift that was output from either the manual shift determining portion 95 or the shift point control shift determining portion 100, and the brake control corresponding to the second shift.

When the second shift, which is a downshift, is to be performed, there is a possibility that the deceleration will increase as a result. If the degree of grip is low (i.e., YES in step S15) at this time, the vehicle may become even more unstable. In order to prevent this, the second shift command and the brake control corresponding to that second shift are cancelled in step S150. After step S150, step S8 is executed. The determination to end the shift in step S8 is directed towards the first shift.

In step S160, the control circuit 130 outputs the shift command corresponding to the signal indicating a need for the second shift that was output from either the manual shift determining portion 95 or the shift point control shift determining portion 100 and executes the second shift which is an upshift. At the same time, the control circuit control circuit 130 ends the brake control corresponding to the first shift. The fact that the command for the second shift, which is an upshift, was output (i.e., NO in step S140) indicates that the deceleration required by the first shift is no longer necessary. By performing the second shift, which is an upshift, the deceleration 402 caused by the shift of the automatic transmission 10 also decreases. Therefore, when the command for the second shift, which is an upshift, has been output (i.e., NO in step S140), the brake control corresponding to the first shift is no longer necessary.

After the brake control has ended in step S160, the determination as to whether to end the shift for the first shift (i.e., step S8) is no longer necessary, so after step S160, step S11 is executed.

As described above, according to the third exemplary embodiment, when an instability phenomenon such as a decrease in the degree of grip has been detected or estimated in the vehicle (i.e., YES in step S15) when there is a downshift by shift point control, the maximum target deceleration Gt' is reduced (step S110) which in turn results in the brake control amount 406' being reduced. As a result, the actual deceleration of the vehicle decreases, making it easier to eliminate an instability phenomenon in the vehicle or prevent one from becoming worse.

Further, the clutch pressure of the automatic transmission 10 is simultaneously reduced (step S120) when an instability phenomenon such as a decrease in the degree of grip has been detected or estimated in the vehicle (i.e., YES in step S15) when there is a downshift by shift point control. Therefore, the maximum value 402max' of the deceleration 402' caused by the shift of the automatic transmission 10 can be reduced to near the maximum target deceleration Gt' while the increase gradient of the deceleration 402' caused by the shift can be made smooth (the shift transitional characteristics can be changed) without canceling the shift of the automatic transmission 10. As a result, it easier to eliminate an instability phenomenon in the vehicle or prevent one from becoming worse.

If an instability phenomenon occurs in the vehicle, it is highly likely that it will occur during the period of increase in the target deceleration 403 or the actual deceleration of the vehicle (i.e., between times t1 and t2 in FIG. 12). During this period (i.e., from time t1 to time t2 in FIG. 12), only the brakes, which have good response, are used to produce a deceleration so any instability phenomenon in the vehicle can be easily controlled. That is, it is possible to quickly stop or reduce the braking force (brake control amount 406) by the brakes. Also during this period (i.e., from time t1 to time t2 in FIG. 12), the automatic transmission 10 has not yet started to shift so the clutch pressure can be reduced easily.

Figure 13A:
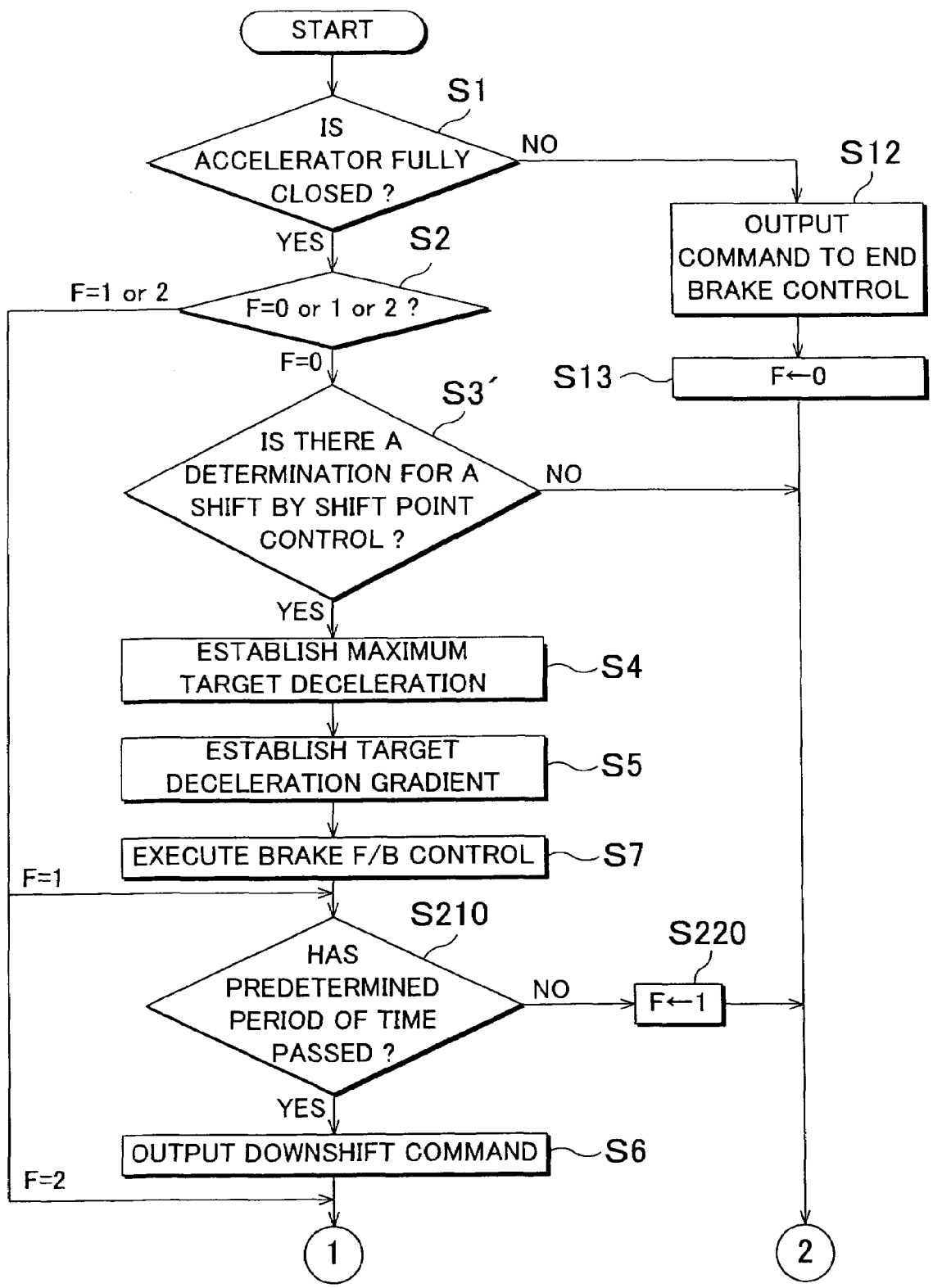
FIGS. 13A and 13B are flowcharts illustrating a control by a deceleration control apparatus for a vehicle according to a fourth exemplary embodiment of the invention.

Next, a fourth exemplary embodiment of the invention will be described with reference to FIGS. 13A and 13B. In the following description of the fourth exemplary embodiment, only those parts that differ from the foregoing exemplary embodiments will be described; descriptions of parts that are the same as those in the foregoing exemplary embodiments will be omitted.

In the first through the third exemplary embodiments, the initial target deceleration 403 is set to increase to the maximum value 402max (≈maximum target deceleration Gt) of the deceleration 402 caused by the shift in the automatic transmission 10 at time t2 before time t3 when the automatic transmission 10 actually starts to shift (steps S4 and S5), which makes it easy to control an instability phenomenon in the vehicle should one occur.

In contrast, there may be cases where brake control alone is not sufficient to keep up with the target, or where the gradient a of the target deceleration 403 can not be set high due to the fact that it may result in deceleration shock. In such cases, it is thought that it may not be possible for the actual deceleration of the vehicle to reach the maximum value 402max (≈maximum target deceleration Gt) of the deceleration 402 caused by the shift of the automatic transmission 10 before time t3 when the shift starts. The fourth exemplary embodiment is particularly effective for dealing with this kind of situation.

Figure 13B:
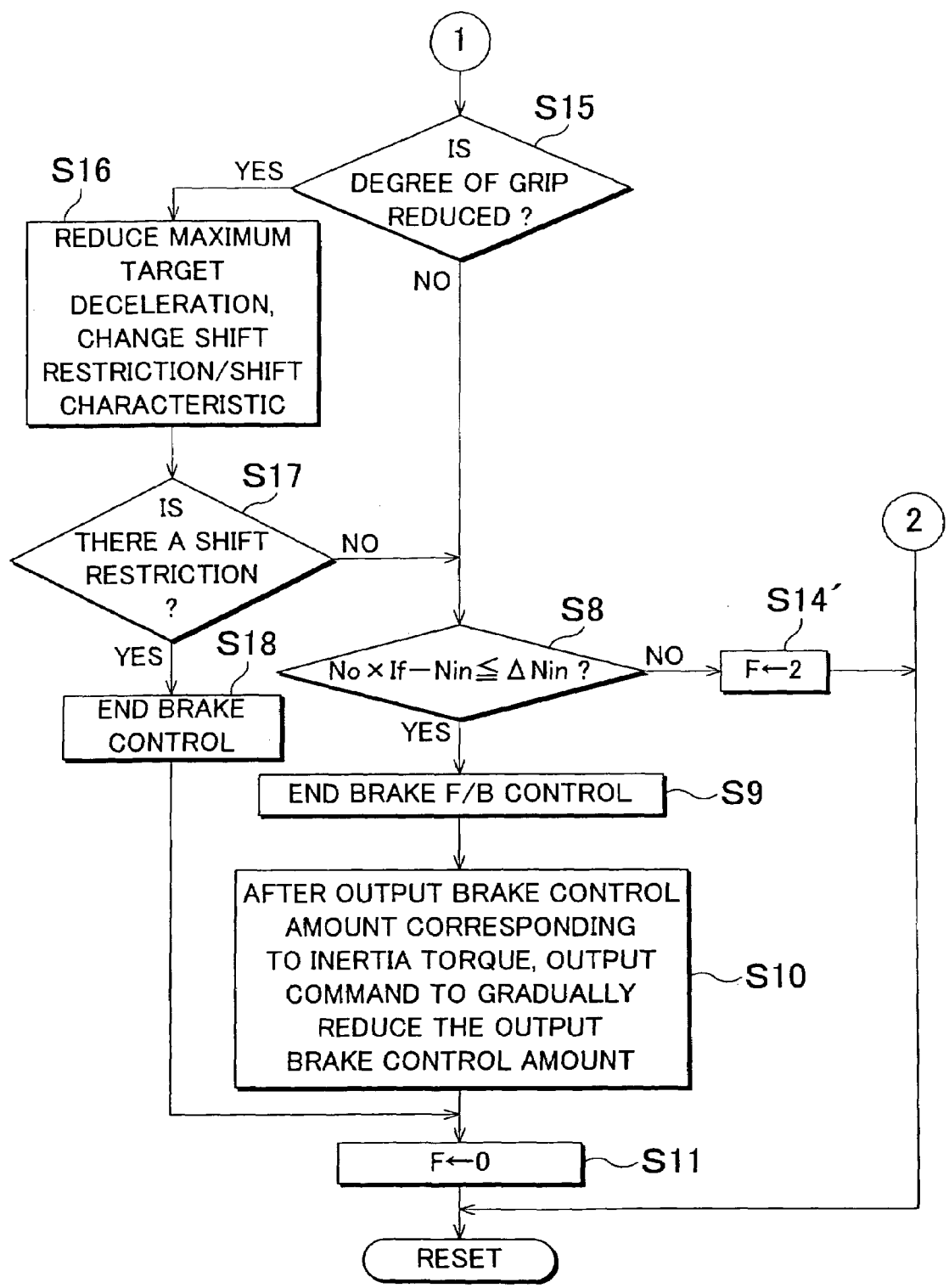

FIGS. 13 and 13B are flowcharts showing the control flow of the fourth exemplary embodiment. The operation for this control flow is stored in advance in the ROM 133. As shown in FIGS. 13 and 13B, the control flow of the fourth exemplary embodiment differs from the control flow of the second exemplary embodiment shown in FIGS. 9A and 9B in that steps S210 and S220 have been added, and the order in which step S6 and step S7 are executed has been reversed. The steps in FIGS. 13 and 13B that are the same as those in the foregoing exemplary embodiments are denoted by the same reference numerals and descriptions thereof will be omitted.

Step S210 is executed after the brake feedback control has started in step S7. In step S210, the control circuit 130 determines whether a predetermined period of time has passed after the brake feedback control has started. If the predetermined period of time has passed (i.e., (YES in step S210), the routine proceeds on to step S6. If, on the other hand, the predetermined period of time has not passed (i.e., NO in step S210), the routine proceeds on to step S220.

At first, the predetermined period of time will not have passed (i.e., NO in step S210) so step S220 is executed. In step S220, the control circuit 130 sets the flag F to 1 and then resets the control flow. Then in step S2, the flag F is determined to be 1 so step S210 is then executed. The operation is repeated in this way until the predetermined time passes (i.e., YES in step S210), at which point step S6 is executed such that a downshift command is output.

As described above, in the second exemplary embodiment, both the brake control is started (step S7) and the downshift command is output (step S6) at time t1. In the fourth exemplary embodiment, however, the downshift command is output (step S6) a predetermined time after (step S210) the brake control is started (step S7; time t1). As a result, the time at which the shift is started can be delayed for a predetermined period of time. Therefore, the actual deceleration of the vehicle is able to reach the maximum value 402max (≈maximum target deceleration Gt) of the deceleration 402 caused by the shift of the automatic transmission 10 before the shift starts.

The predetermined time in step S210 is able to be changed by the control circuit 130 according to the type of shift. This is because the time from the time that the downshift command is output until the time that the shift starts changes depending on the type of shift.

In this exemplary embodiment, the time that the automatic transmission 10 starts to shift is delayed, but by performing cooperative control with the brakes (steps S4, S5, and S7), the vehicle actually starts to decelerate earlier than when it is decelerated by the shift of the automatic transmission 10 alone. Therefore, the driver is not aware that the starting time of the shift of the automatic transmission 10 is late, and any adverse effects from the delayed shift starting time are able to be kept to the minimum.

Step S14' in FIG. 13B differs from step S14 in FIG. 9B in that, in step S14' in FIG. 13B, the flag F is set to 2 instead of 1 because it is set to 1 in step S220.

In the fourth exemplary embodiment, the control flow differs from the control flow of the second exemplary embodiment shown in FIGS. 9A and 9B in that steps S210 and S220 have been added, and the order in which step S6 and step S7 are executed has been reversed. Alternatively, however, is also possible to add steps S210 and S220 and reverse the order in which step S6 and step S7 are executed in the control flow of the first exemplary embodiment (FIG. 1).

Various modifications are possible with the foregoing first through the fourth exemplary embodiments. For example, in the example described above, brake control is used. Instead of brake control, however, regenerative control by a MG (motor/generator) apparatus provided in a power train system (as in the case of a hybrid system) can also be used. Further, in the example described above, a stepped automatic transmission 10 is used for the transmission. The invention may also be applied, however, to a CVT (continuously variable transmission).

Moreover, in the above description, operation to avoid an instability phenomenon in the vehicle (such as a reduction in the degree of tire grip) is performed in the case of a shift by shift point control. This kind of operation may also be performed in the case of a manual shift as well. In this case, the criteria (the degree of slip, in the above description) for performing the operation to avoid an instability phenomenon in the vehicle can be set differently for a manual shift than it is for a shift by shift point control. For example, in the case of a manual shift, the deceleration increases according to the intention of the driver, so it is possible to make the criteria stricter (i.e., make it more difficult for the avoidance operation to be performed) so that the result will not contradict the intention of the driver (i.e., the amount of increase in the deceleration will not be easily reduced).

Further, in the example described above, the degree of grip is used as an example of the criteria that is detected or estimated by the vehicle instability detecting/estimating portion 118 and used for performing the operation to avoid an instability phenomenon in the vehicle. Alternatively, however, other indicators, such as an actual occurrence of an instability phenomenon (such as slipping of the tires) (e.g., a detection made by a difference between the rotation speeds of the front and rear tires, etc.), vehicle yaw, or operating signals for VSC (vehicle stability control) may also be used. Furthermore, the criteria for the operation to avoid an instability phenomenon in the vehicle may also use different indicators depending on whether the shift is a shift by shift point control or a manual shift. Also, in the example described above, the deceleration (G) is used as the deceleration indicative of the amount of deceleration of the vehicle. Alternatively, however, the control may be performed based on the deceleration torque.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A deceleration control apparatus for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than a current speed or a higher speed ratio than a current speed ratio, comprising:
a controller which, when a determination that there is a need to shift the transmission into the lower speed than the current speed or the higher speed ratio than the current speed ratio has been made, increases the target deceleration over time at a predetermined gradient to a predetermined value, and after the target deceleration reaches the predetermined value, maintains the target deceleration at a generally constant value,
wherein the controller sets the target deceleration to reach the predetermined value before the shift into the lower speed than the current speed or the higher speed ratio than the current speed ratio actually starts.

2. The deceleration control apparatus for a vehicle according to claim 1, wherein the controller sets the predetermined value to include a maximum value of the deceleration caused by the shift into the lower speed than the current speed or the higher speed ratio than the current speed ratio.

3. A deceleration control apparatus for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than a current speed or a higher speed ratio than a current speed ratio, comprising:
a controller which, when a determination that there is a need to shift the transmission into the lower speed than the current speed or the higher speed ratio than the current speed ratio has been made, increases the target deceleration over time at a predetermined gradient to a predetermined value, and after the target deceleration reaches the predetermined value, maintains the target deceleration at a generally constant value,
wherein the controller controls the timing of the shift operation so that the shift into the lower speed than the current speed or the higher speed ratio than the current speed ratio does not actually start before the deceleration acting on the vehicle reaches the predetermined value.

4. The deceleration control apparatus for a vehicle according to claim 3, wherein the controller sets the predetermined value to include a maximum value of the deceleration caused by the shift into the lower speed than the current speed or the higher speed ratio than the current speed ratio.

5. A deceleration control apparatus for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than the current speed or a higher speed ratio than a current speed ratio, comprising:
a controller which, when a determination that there is a need to shift the transmission into the lower speed than the current speed or the higher speed ratio than the current speed ratio has been made, increases the target deceleration over time at a predetermined gradient to a predetermined value, and after the target deceleration reaches the predetermined value, maintains the target deceleration at a generally constant value,
wherein the controller determines the predetermined gradient based on a state of a road.

6. A deceleration control apparatus for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than the current speed or a higher speed ratio than a current speed ratio, comprising:
a controller which, when a determination that there is a need to shift the transmission into the lower speed than the current speed or the higher speed ratio than the current speed ratio has been made, increases the target deceleration over time at a predetermined gradient to a predetermined value, and after the target deceleration reaches the predetermined value, maintains the target deceleration at a generally constant value,
wherein the controller determines the predetermined gradient based on a change in an accelerator opening amount.

7. The deceleration control apparatus for a vehicle according to claim 6, wherein the predetermined gradient is determined such that the gradient is greater as an accelerator return rate is greater.

8. A deceleration control apparatus for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than a current speed or a higher speed ratio than a current speed ratio, comprising:
a controller which, when a determination that there is a need to shift the transmission into the lower speed than the current speed or the higher speed ratio than the current speed ratio has been made, increases the target deceleration over time at a predetermined gradient to a predetermined value, and after the target deceleration reaches the predetermined value, maintains the target deceleration at a generally constant value, the predetermined gradient of the target deceleration is determined such that the deceleration applied to the vehicle is equal to the target deceleration only by an actuation of the brake.

9. A deceleration control apparatus for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than a current speed or a higher speed ratio than the current speed ratio, comprising:

a controller which, when a determination that there is a need to shift the transmission into the lower speed than the current speed or the higher speed ratio than the current speed ratio has been made, increases the target deceleration over time at a predetermined gradient to a predetermined value, and after the target deceleration reaches the predetermined value, maintains the target deceleration at a generally constant value, wherein when an unstable state of the vehicle is detected, estimated, or anticipated, the controller executes at least one of i) reducing the value of the predetermined value, ii) restricting the shift into the lower speed than the current speed or the higher speed ratio than the current speed ratio, iii) changing a shift transitional characteristic, and iv) restricting the shift into the lower speed than the current speed or the higher speed ratio than the current speed ratio in response to another determination made after the determination that there is a need to shift the transmission into a relatively lower speed than the current speed or the higher speed ratio than the current speed ratio was made.

10. The deceleration control apparatus for a vehicle according to claim 9, wherein the controller reduces hydraulic pressure supplied to the transmission when the unstable state of the vehicle is detected, estimated, or anticipated.

11. A deceleration control method for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than a current speed or a higher speed ratio than a current speed ratio, comprising:

increasing the target deceleration over time at a predetermined gradient to a predetermined value when a determination that there is a need to shift the transmission into the lower speed than the current speed or the higher speed ratio than the current speed ratio has been made;

maintaining the target deceleration at a generally constant value after the target deceleration reaches the predetermined value; and setting the target deceleration with a controller, to reach the predetermined value before the shift into the lower speed than the current speed or the higher speed ratio than the current speed ratio actually starts.

12. The deceleration control method for a vehicle according to claim 11, further comprising setting the predetermined value to include a maximum value of the deceleration caused by the shift into the lower speed than the current speed or the higher speed ration than the current speed ratio.

13. A deceleration control method for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than a current speed or a higher speed ratio than a current speed ratio, comprising:

increasing the target deceleration over time at a predetermined gradient to a predetermined value when a determination that there is a need to shift the transmission into the lower speed than the current speed or the higher speed ratio than the current speed ratio has been made;

maintaining the target deceleration at a generally constant value after the target deceleration reaches the predetermined value; and controlling the timing of the shift operation with a controller, so that the shift into the lower speed than the current speed or the higher speed ratio than the current speed ratio does not actually start before the deceleration acting on the vehicle reaches the predetermined value.

14. The deceleration control method for a vehicle according to claim 13, further comprising setting the predetermined value to include a maximum value of the deceleration caused by the shift into the lower speed than the current speed or the higher speed ration than the current speed ratio.

15. A deceleration control method for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than a current speed or a higher speed ratio than a current speed ratio, comprising:

increasing the target deceleration over time at a predetermined gradient to a predetermined value when a determination that there is a need to shift the transmission into the lower speed than the current speed or the higher speed ratio than the current speed ratio has been made;

maintaining the target deceleration at a generally constant value after the target deceleration reaches the predetermined value; and determining the predetermined gradient based on a state of a road.

16. A deceleration control method for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than a current speed or a higher speed ratio than a current speed ratio, comprising:

increasing the target deceleration over time at a predetermined gradient to a predetermined value when a determination that there is a need to shift the transmission into the lower speed than the current speed or the higher speed ratio than the current speed ratio has been made;

maintaining the target deceleration at a generally constant value after the target deceleration reaches the predetermined value; and determining the predetermined gradient based on a change in an accelerator opening amount.

17. The deceleration control method for a vehicle according to claim 16, wherein the predetermined gradient is determined such that the gradient is greater as an accelerator return rate is greater.

18. A deceleration control method for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than a current speed or a higher speed ratio than a current speed ratio, comprising:

increasing the target deceleration over time at a predetermined gradient to a predetermined value when a determination that there is a need to shift the transmission into the lower speed than the current speed or the higher speed ratio than the current speed ration has been made;

maintaining the target deceleration at a generally constant value after the target deceleration reaches the predetermined value, wherein the predetermined gradient of the target deceleration is determined such that the deceleration applied to the vehicle is equal to the target deceleration only by an actuation of the brake.

19. A deceleration control method for a vehicle, which performs deceleration control such that a deceleration acting on the vehicle becomes equal to a target deceleration by an operation of a brake system which applies a braking force to the vehicle and a shift operation which shifts a transmission of the vehicle into a lower speed than a current speed or a higher speed ratio than a current speed ratio, comprising:

increasing the target deceleration over time at a predetermined gradient to a predetermined value when a determination that there is a need to shift the transmission into the lower speed than the current speed or the higher speed ratio than the current speed ratio has been made;

maintaining the target deceleration at a generally constant value after the target deceleration reaches the predetermined value, wherein when an unstable state of the vehicle is detected, estimated, or anticipated, a controller executes at least one of i) reducing the value of the predetermined value, ii) restricting the shift into the lower speed than the current speed or the higher speed ratio than the current speed ratio, iii) changing a shift transitional characteristic, and iv) restricting the shift into the lower speed than the current speed or the higher speed ratio than the current speed ratio in response to another determination made after the determination that there is a need to shift the transmission into the lower speed than the current speed or the higher speed ratio than the current speed ratio was made.

20. The deceleration control method for a vehicle according to claim 19, further comprising reducing hydraulic pressure supplied to the transmission when the unstable state of the vehicle is detected, estimated, or anticipated.

* * * * *